(12) United States Patent
Ogawa et al.

(10) Patent No.: US 10,703,217 B2
(45) Date of Patent: Jul. 7, 2020

(54) INDUCTOR UNIT, NON-CONTACT POWER SUPPLY SYSTEM AND ELECTRIC VEHICLE

(71) Applicant: KABUSHIKI KAISHA TOSHIBA, Minato-ku, Tokyo (JP)

(72) Inventors: Kenichirou Ogawa, Kawasaki Kanagawa (JP); Masatoshi Suzuki, Susono Shizuoka (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/127,675

(22) Filed: Sep. 11, 2018

(65) Prior Publication Data

US 2019/0270388 A1   Sep. 5, 2019

(30) Foreign Application Priority Data

Mar. 1, 2018   (JP) .................................. 2018-036618

(51) Int. Cl.
*B60L 53/12* (2019.01)
*H02J 50/70* (2016.01)
*H02J 50/12* (2016.01)
*H02J 7/02* (2016.01)

(52) U.S. Cl.
CPC .............. *B60L 53/12* (2019.02); *H02J 7/025* (2013.01); *H02J 50/12* (2016.02); *H02J 50/70* (2016.02)

(58) Field of Classification Search
CPC . B60L 53/12; H02J 50/70; H02J 50/12; H02J 7/025
USPC ....................................................... 320/108
See application file for complete search history.

(56) References Cited

U.S. PATENT DOCUMENTS

| 4,223,290 | A  | * | 9/1980 | Agatahama | ............... | H01F 7/14 335/229 |
| 6,704,203 | B2 | * | 3/2004 | Chapuis    | ................. | H02M 3/00 165/185 |
| 7,518,085 | B1 | * | 4/2009 | Krishnan   | .............. | F03H 1/0012 219/121.48 |
| 7,982,573 | B2 | * | 7/2011 | Mori       | .................. | H01F 17/0013 336/200 |

(Continued)

FOREIGN PATENT DOCUMENTS

JP   2010172084 A   8/2010
WO  2015189976 A1  12/2015

OTHER PUBLICATIONS

K. Kusaka, et al., "Experimental Verification of Three-phase Inductive Power Transfer System with 12 coils," 2017 IEE Japan, pp. 439-442.

*Primary Examiner* — M Baye Diao
(74) *Attorney, Agent, or Firm* — Holtz, Holtz & Volek PC

(57) ABSTRACT

According to one embodiment, an inductor unit includes a first inductor and a second inductor. The first inductor includes a first magnetic core and a first coil winded around the first magnetic core. The second inductor includes a second magnetic core and a second coil winded around the second magnetic core. The first inductor and the second inductor are placed so that a first angle between a first line and a fifth line is equal to or greater than 0 degrees and is equal to or less than 90 degrees. The cross section of the first coil in the width direction and a cross section of the first coil in the width direction are overlapping at least at direction of the first magnetic flux or direction of the second magnetic flux.

14 Claims, 39 Drawing Sheets

(56) References Cited

U.S. PATENT DOCUMENTS

| | | | | |
|---|---|---|---|---|
| 8,130,068 B2* | 3/2012 | Mori | ............... | H01F 17/0013 336/200 |
| 8,833,533 B2* | 9/2014 | Suh | ............... | B60L 11/1816 191/10 |
| 9,515,493 B2* | 12/2016 | Chiyo | ............... | H01F 27/38 |
| 10,446,316 B2* | 10/2019 | Furiya | ............... | B60L 53/12 |
| 2007/0090916 A1* | 4/2007 | Rao | ............... | H01F 17/062 336/229 |
| 2009/0096413 A1* | 4/2009 | Partovi | ............... | H01F 5/003 320/108 |
| 2010/0214050 A1* | 8/2010 | Opina, Jr. | ............... | H01F 17/045 336/192 |
| 2012/0103741 A1* | 5/2012 | Suh | ............... | B60L 11/1816 191/10 |
| 2012/0218068 A1* | 8/2012 | Yamakawa | ............... | B60L 53/12 336/90 |
| 2015/0102881 A1* | 4/2015 | Giengiel | ............... | H01F 27/24 336/5 |
| 2015/0380157 A1* | 12/2015 | Green | ............... | H01F 27/365 307/104 |
| 2017/0012477 A1 | 1/2017 | Shijo et al. | | |
| 2017/0076854 A1* | 3/2017 | Tokura | ............... | H01F 27/306 |
| 2017/0288469 A1* | 10/2017 | Murashige | ............... | H02J 50/10 |
| 2018/0218826 A1* | 8/2018 | Millsap | ............... | H01F 27/263 |
| 2018/0234008 A1* | 8/2018 | Wolf | ............... | H02M 1/143 |
| 2018/0254136 A1* | 9/2018 | Ueda | ............... | H01F 27/28 |
| 2018/0262063 A1* | 9/2018 | Oki | ............... | H01F 27/2871 |

* cited by examiner

US 10,703,217 B2

INDUCTOR UNIT, NON-CONTACT POWER SUPPLY SYSTEM AND ELECTRIC VEHICLE

CROSS-REFERENCE TO RELATED APPLICATIONS

This application is based upon and claims the benefit of priority from Japanese Patent Application No. 2018-036618, filed on Mar. 1, 2018; the entire contents of which are hereby incorporated by reference.

FIELD

Embodiments described herein relate generally to an inductor unit, a non-contact power supply system and an electric vehicle.

BACKGROUND

In order to increase transmitted power and to realize quick charging of secondary batteries, inductor units including a plurality of inductors are placed in both the transmitting side (primary side) and the receiving side (secondary side) for non-contact power supply systems. For higher transmission efficiency, the coupling coefficient between the inductors located in the same side needs to be kept low. Also, for the sake of safety to the human body and lower electromagnetic noise, it is necessary to reduce the strength of leakage magnetic field.

If inductors in the same side are located so that they are in a certain angle, it is possible to reduce the coupling coefficient. Also, by configuring the current of each inductor to opposite phases or by winding the coils in the opposite direction, it is possible to reduce the leakage magnetic field. If the inductors belonging to the same side are located adjacently, the attenuation effect of leakage magnetic field becomes stronger. However, due to physical restrictions, it is difficult to reduce the distance between the inductors.

DETAILED DESCRIPTION

According to one embodiment, an inductor unit includes a first inductor and a second inductor. The first inductor includes a first magnetic core and a first coil winded around the first magnetic core. The second inductor includes a second magnetic core and a second coil winded around the second magnetic core. The first inductor and the second inductor are placed so that a first angle between a first line and a fifth line is equal to or greater than 0 degrees and is equal to or less than 90 degrees. The first line is same direction as a first magnetic flux generated by the first coil and passes through center of the first coil in a width direction. A second line is perpendicular to the first magnetic flux and passes through center of the first coil in a length direction. A first point is an intersection of the first line and the second line. A third line is same direction as a second magnetic flux generated by the second coil and passes through center of the second coil in the width direction. A fourth line is perpendicular to the second magnetic flux and passes through center of the second coil in the length direction. A second point is an intersection of the third line and the fourth line. The fifth line is a line which connects the first point and the second point. The cross section of the first coil in the width direction and a cross section of the first coil in the width direction are overlapping at least at direction of the first magnetic flux or direction of the second magnetic flux.

Hereinafter, embodiments of the present invention will be described with reference to the drawings.

First Embodiment

Figure 1:
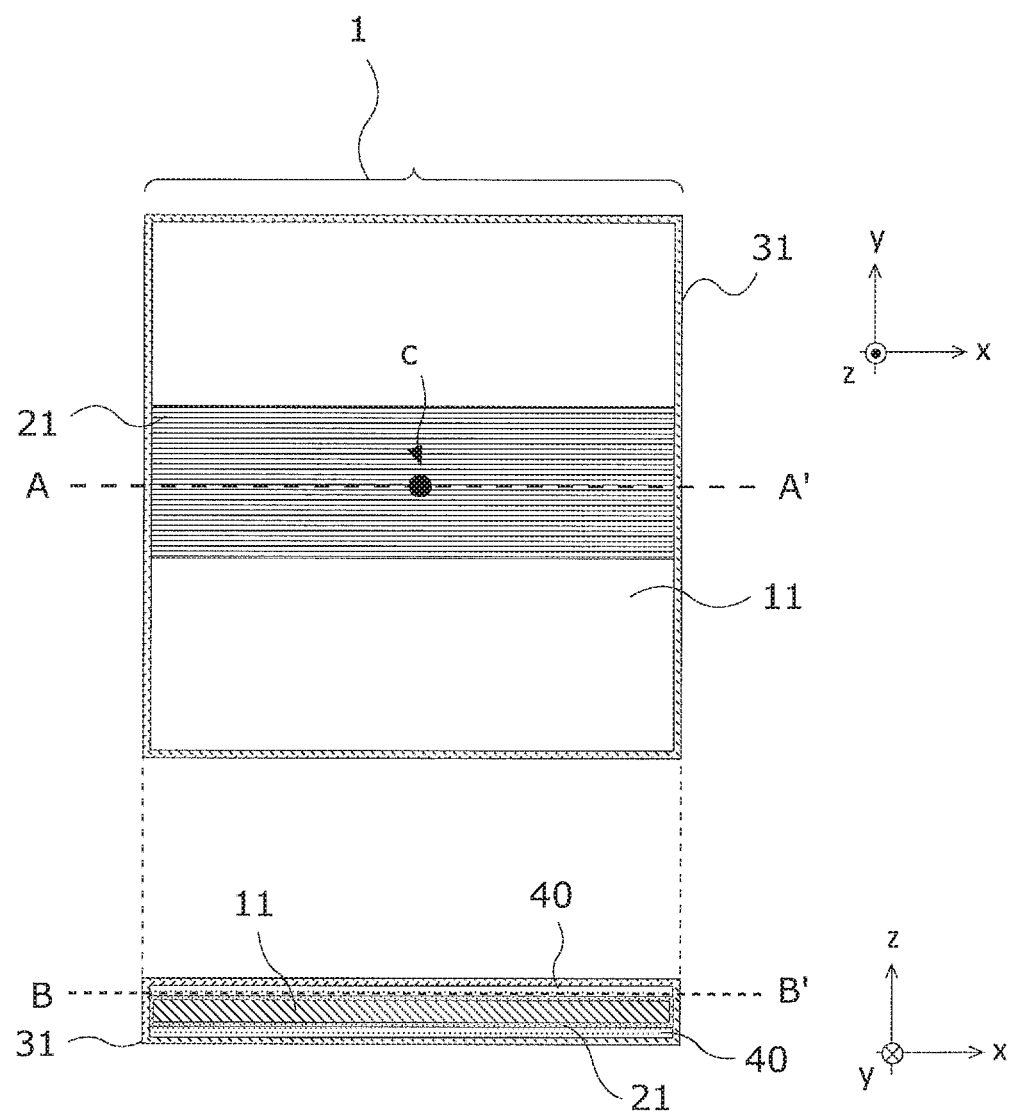
FIG. 1 is a diagram of an inductor.

FIG. 1 is a diagram of an inductor according to a first embodiment. An inductor according to a first embodiment will be described with reference to FIG. 1. The top of FIG. 1 is a plan view diagram of an inductor 1. The bottom of FIG. 1 is a cross-sectional diagram of the inductor 1. By cutting the inductor 1 in the top of FIG. 1 by a z-x plain including a broken line AA', it is possible to obtain the cross-sectional diagram in the bottom of FIG. 1. By cutting the inductor 1 in the cross-sectional diagram in the bottom of FIG. 1 by a plain x-y plain including a broken line BB', it is possible to obtain the plan view diagram in the top of FIG. 1.

The inductor 1 includes a coil 21 winded around a magnetic core 11. The coil 21 forms a solenoid coil. Both the magnetic core 11 and the coil 21 are installed in a casing 31. As illustrated in the cross-sectional diagram in the bottom of FIG. 1, in one embodiment, the space between the casing 31 and the combination of the magnetic core 11 plus the coil 21 is enclosed with a filling material 40.

The inductor 1 (magnetic core 11) is configured in an approximately plan view rectangular shape. However, this shape is only one example. The shape of the inductor 1 (magnetic core 11) in the plan view and the thickness in the z-axis direction is not limited.

The magnetic core 11 is formed from magnetic substances. Examples of magnetic substances include iron oxide, chromium oxide, cobalt and ferrite. However, the type of magnetic substance is not limited. The coil 21 is formed from metal. Examples of metals include copper, aluminum, Litz wires and bus bars. As long as conductive materials are used, the type of material used for forming the coil 21 is not limited. In one embodiment, the surface of the wiring or conductors forming the coil 21 is covered with insulators.

The casing 31 and the filling material 40 support the magnetic core 11 and the coil 21 in specific locations within the inductor. Also, the casing 31 and the filling material 40 protect the magnetic core 11 and the coil 21 from external shocks and vibrations. Also, the casing 31 and the filling material 40 emit the heat generated from the magnetic core 11 and the coil 21 to the exterior. Examples of the materials used for the casing 31 and the filling material include resin and rubber. However, the type of material used is not limited. Also, in one embodiment, the inductor does not have a casing and a filling material.

Figure 2:
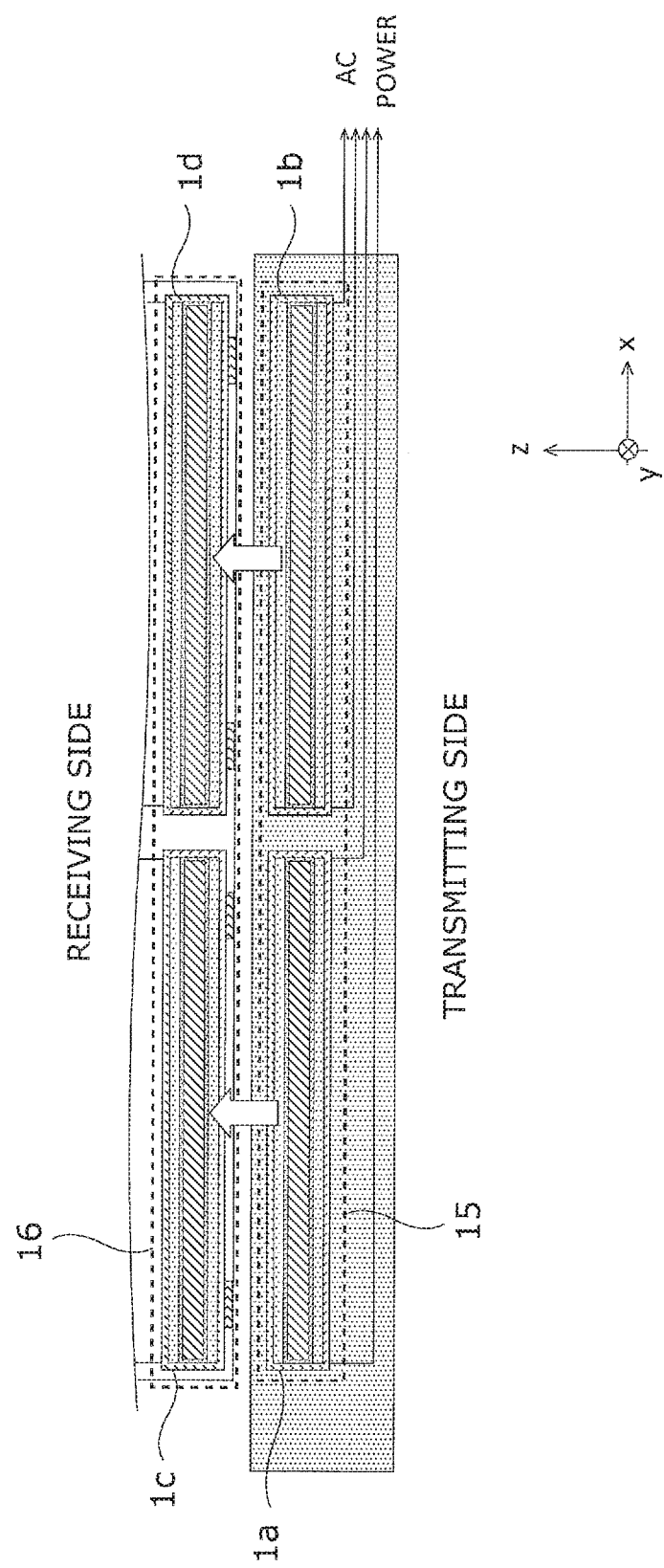
FIG. 2 is a diagram of a non-contact power supply system including inductors.

FIG. 2 is a diagram of a non-contact power supply system including inductors. FIG. 2 is a cross-sectional diagram of the non-contact power supply system cut in the z-x plain. In the non-contact power supply system of FIG. 2, an inductor 1a and an inductor 1b are placed in the transmitting side (primary side). In the receiving side (secondary side), an inductor 1c and an inductor 1d are placed. In one embodiment, inductors of uniform shapes and configurations are used as the inductors 1a to 1d.

In the example of FIG. 2, the inductor 1a is coupled with the inductor 1c by electromagnetic induction or magnetic resonance during wireless power transmission. The inductor 1c is facing the inductor 1a. Similarly, the inductor 1b which faces the inductor 1d is coupled with the inductor 1d by electromagnetic induction or magnetic resonance during wireless power transmission. Both the inductor 1a and the inductor 1b are electrically connected to the AC power. In one embodiment, the inductors are connected to capacitors to form resonance circuits. The frequency used for wireless power transmission is not limited.

As shown in the example of FIG. 2, it is possible to configure a non-contact power supply system by allocating a plurality of inductors in the same side. Then, it is possible to increase the electric power transmitted from the primary side (transmitting side) to the secondary side (receiving side), accelerating the charging of batteries. In the example of FIG. 2, two inductors are located in the same side. However, in one embodiment, a different number of inductors are located in the same side. In the following description, if a combination of inductors is mentioned, it indicates a plurality of inductors belonging to the same side.

In the non-contact power transmission system, the combination of inductors used in the transmitting side (primary side) or the receiving side (secondary side) are called inductor units. In the example of FIG. 2, an inductor unit 15 in the transmitting side (primary side) includes the inductor 1a and the inductor 1b. Also, an inductor unit 16 in the receiving side (secondary side) includes the inductor 1c and the inductor 1d.

Figure 3:
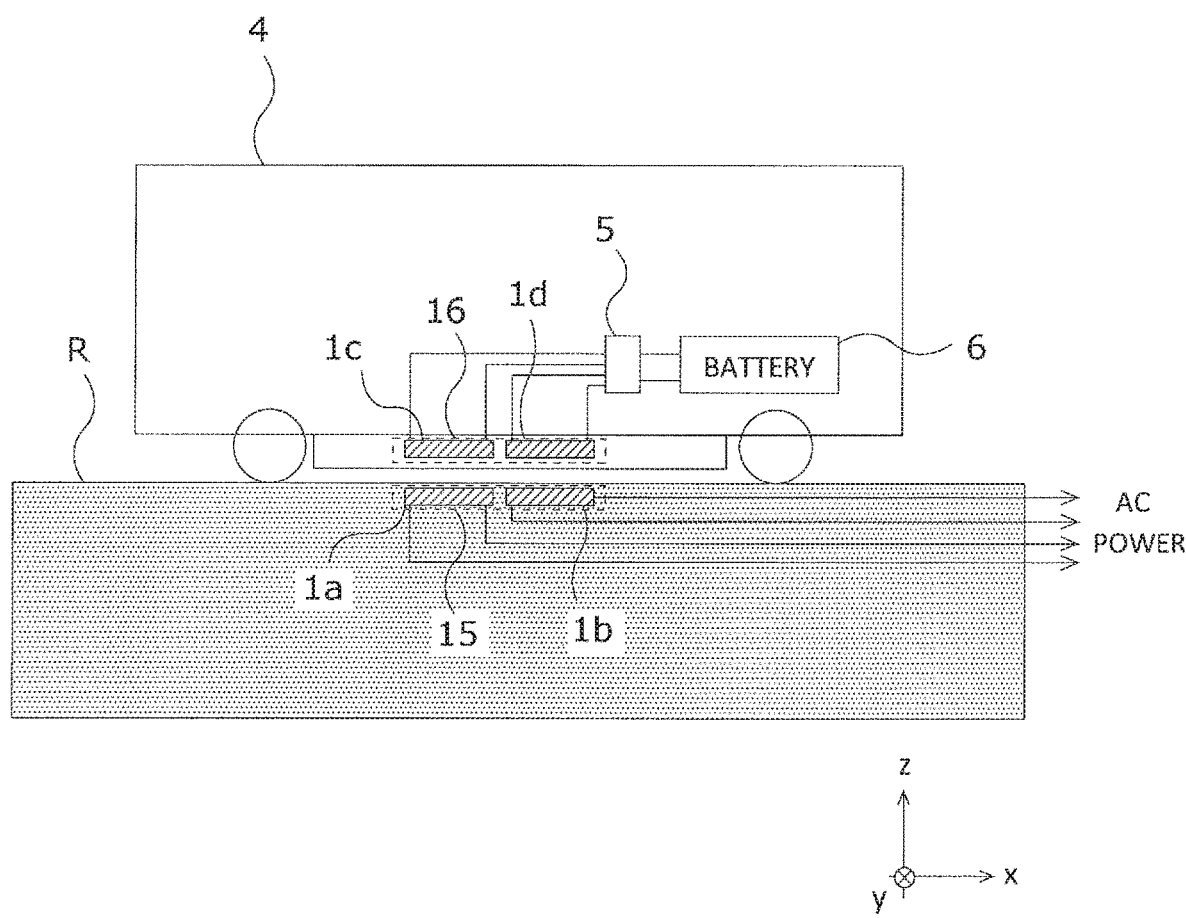
FIG. 3 is a diagram of a non-contact power supply system applied to an electric vehicle.

FIG. 3 is a diagram of a non-contact power supply system applied to an electric vehicle. In the non-contact power supply system of FIG. 3, power is supplied to the electric vehicle 4 on the road R. The inductor 1a and the inductor 1b are embedded in the road R as the inductor unit 15 in the transmitting side (primary side). Both the inductor 1a and the inductor 1b are electrically connected to the AC power. In the bottom of the electric vehicle 4, the inductor 1c and the inductor 1a are placed as the inductor 16 in the receiving side (secondary side). Similar to the example in FIG. 2, the inductor 1a is electromagnetically coupled to the inductor 1c in the other side during wireless power transmission. The inductor 1b is electromagnetically coupled to the inductor 1d in the other side during wireless power transmission.

The distances between the facing inductors are not limited. However, for the sake of transmission efficiency, it is possible to make the distance smaller. The configuration of FIG. 3 is only an example. Thus, it is possible to implement the inductor units in locations other than the bottom of the electric vehicle. For example, in one embodiment, the inductor unit is implemented on the sides of the electric vehicle.

The AC power received by the inductor is and the inductor id is converted to DC power by a rectifier circuit 5. Then, the DC power is supplied to a battery 6. In one embodiment, a DC-DC converter is implemented between the rectifier circuit 5 and the battery 6. Thereby, the voltage (the current) of the electric power supplied to the battery 6 is adjusted. The battery 6 is a secondary battery. Examples of the secondary battery include lithium-ion batteries and lead-acid batteries. However, the type of secondary battery is not limited.

In one embodiment, the inductor of the transmitting side (primary side) is implemented in the road (ground) of parking lots, bus-stops or garages. However, the location of the inductors is not limited. Examples of electric vehicles include buses, trucks and automobiles with rubber tires. In one embodiment, the electric vehicle is a moving body such as railway vehicles, street cars, monorail trains or construction machines. In another embodiment, the electric vehicle is a car or an EV bus driven by electric power. In one embodiment, the electric vehicle is a hybrid vehicle which is driven with a combination of an internal-combustion system and electric power. In another embodiment, the electric vehicle is a gasoline-powered vehicle or a diesel car with at least part of the equipment installed in the vehicle driven by electric power.

Next, the relation between the locations of the inductors within the inductor unit of the same side and the characteristics of the non-contact power supply system is explained.

Figure 4:
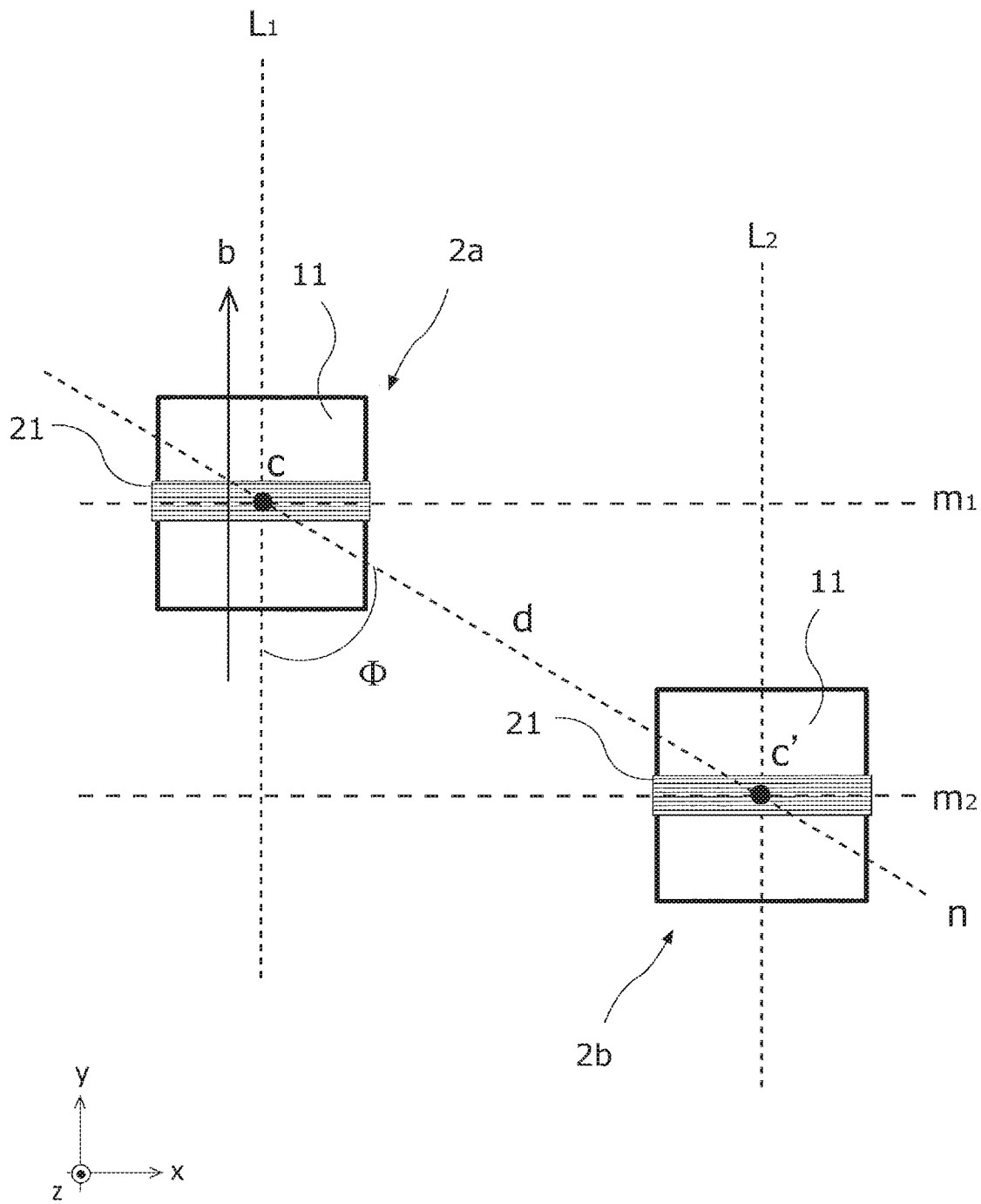
FIG. 4 is a plan view of an inductor unit including inductors.

FIG. 4 is a plan view of an inductor unit including inductors. The example of FIG. 4, is a plan view diagram which shows the locations of the inductors within the inductor unit. FIG. 4 is the plan view configuration of a combination of inductors including an inductor 2a and an inductor 2b. Both the inductor 2a and the inductor 2b belong to the transmitting side (primary side) or the receiving side (secondary side). In the following, if a plan view diagram with a plurality of inductors is presented, the inductors in then plan view diagram are combination of inductors belonging to the same inductor unit, operating as either the transmitting side (primary side) or the receiving side (secondary side) of the non-contact power supplying system.

In the following description, the direction b (y-axis direction in FIG. 4) is called a length direction of the inductor. The direction b (y-axis direction in FIG. 4) is the direction of the magnetic field (magnetic flux) within the magnetic core generated when current is flowing in the coil (when the inductor is operating). Also, the direction perpendicular to the length direction of the inductor is called a width direction of the inductor (the coil). The width direction of the inductor (the coil) is the direction of the magnetic flux.

The z-axis direction is the thickness direction of the inductor. Similarly, the length direction of the coil (y-axis direction) is the direction of the magnetic flux generated by the coil. The width direction of the coil (x-axis direction) is the direction the coil is winded.

A broken line $L_1$ (first line) passes through a center of a coil 21 (first coil) in the inductor 2a (first inductor) to the width direction. The broken line $L_1$ (first line) is the same direction as a first magnetic flux generated by the coil 21 (first coil). Similarly, a broken line $L_2$ (third line) passes through a center of a coil 21 (second coil) in the inductor 2b (second inductor) to the width direction. The broken line $L_2$ (third line) is the same direction as a second magnetic flux generated by the coil 21 (second coil).

A broken line $m_1$ (second line) passes through a center of the coil 21 (first coil) in the inductor 2a (first inductor) to the length direction. The broken line $m_1$ (second line) is perpendicular to the direction of the first magnetic flux. Also, a broken line $m_2$ (fourth line) passes through a center of the coil 21 (second coil) in the inductor 2b (second inductor) to the length direction. The broken line $m_2$ (fourth line) is perpendicular to the direction of the second magnetic flux.

In the example of FIG. 4, the inductor 2a and the inductor 2b are located so that the generated magnetic fluxes are approximately parallel.

Therefore, in FIG. 4, the broken line $L_1$ (first line) and the broken line $L_2$ (third line) are approximately parallel to each other. Similarly, in FIG. 4, the broken line $m_1$ (second line) and the broken line $m_2$ (fourth line) are approximately parallel to each other. However, the broken line $L_1$ (first line) and the broken line $L_2$ (third line) does not necessary have to be approximately parallel to each other. Similarly, the broken line $m_1$ (second line) and the broken line $m_2$ (fourth line) does not necessary have to be approximately parallel to each other. The sizes of the inductor 2a (first inductor) and the inductor 2b (second inductor) in the length direction and the width direction are not limited.

An intersection of the broken line $L_1$ (first line) and the broken line $m_1$ (second line) on the inductor 2a (first inductor) is called point c (first point). An intersection of the broken line $L_2$ (third line) and the broken line $m_2$ (fourth line) on the inductor 2b (second inductor) is called point c' (second point). A broken line n (fifth line) connects the point c (first point) and the point c' (second point). The distance between the point c and the point c' on the broken line n is d. The angle (first angle) between the broken line $L_1$ (first line) and the broken line n (fifth line) is $\Phi$. In the example of FIG. 4, the angle $\Phi$ is configured to approximately 60 degrees. However, the angle $\Phi$ is configurable to any value which is equal to or greater than 0 degrees and equal to or less than 90 degrees.

Figure 5:
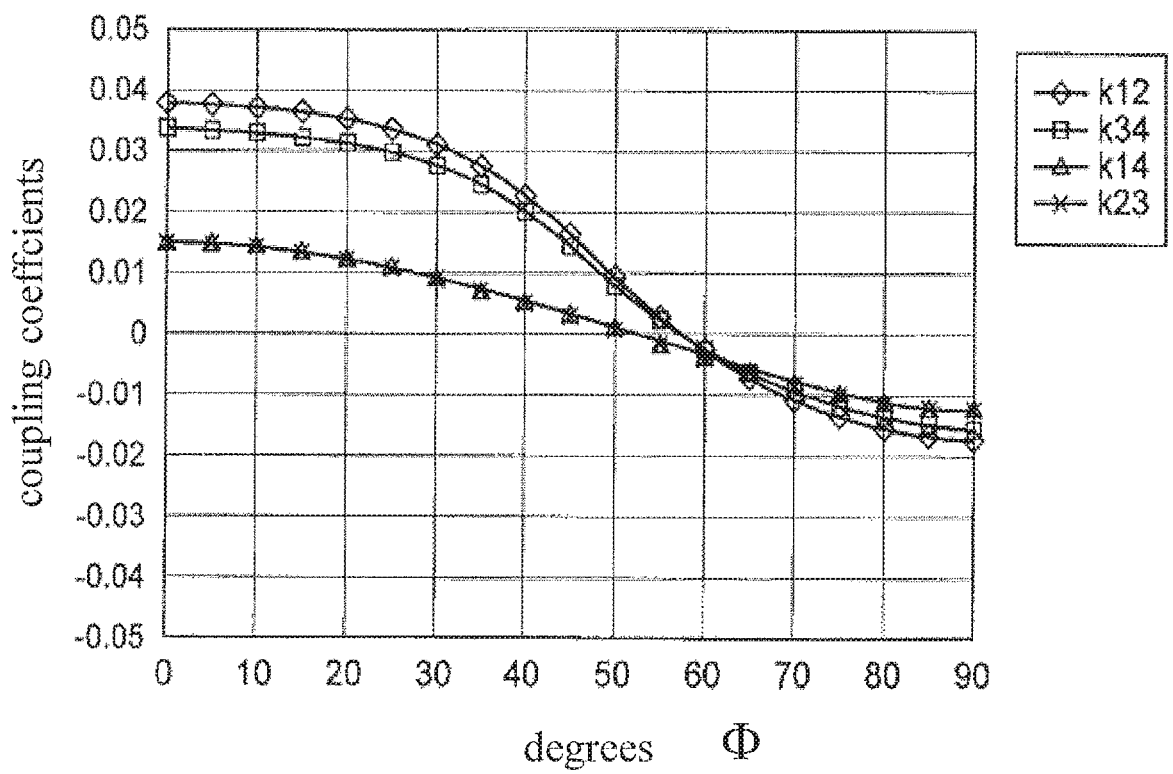
FIG. 5 is a graph showing relationship between angle Φ and coupling coefficient.

FIG. 5 is a graph showing relationship between angle $\Phi$ and coupling coefficient. The horizontal axis of FIG. 5 represents the angle $\Phi$. The vertical axis of FIG. 5 represents the coupling coefficient. Referring to FIG. 5, when the angle $\Phi$ is between 50 degrees and 70 degrees, it is possible to keep the absolute value of the coupling coefficient approximately 0.01 or smaller. Thus, it is possible to reduce the interference between in the inductors belonging to the same side in the inductor unit. In one embodiment, the angle $\Phi$ is configured to a value equal to or greater than 50 degrees and equal to or less than 70 degrees.

Figure 6:
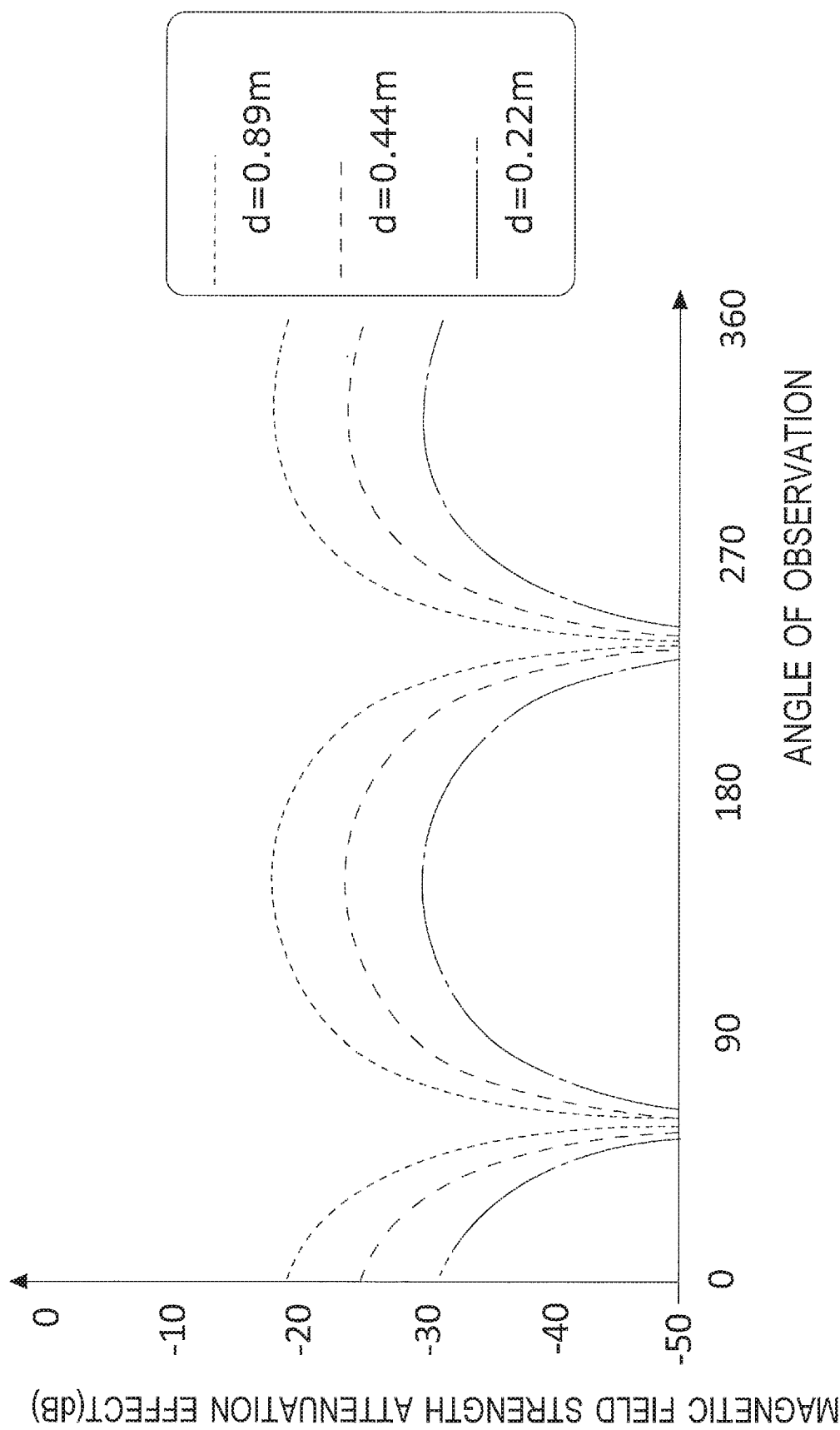
FIG. 6 is a graph showing relationship between distance between inductors and magnetic field strength attenuation effect.

FIG. 6 is a graph showing relationship between distance between inductors and magnetic field strength attenuation effect. In the graph of FIG. 6, the inductors are located according to the allocation in FIG. 4. Opposite phase currents are flowing in each inductor. The graph of FIG. 6 represents the theoretical values of the magnetic field strength attenuation effect at a point which is 10 m away from the inductor. The horizontal axis of FIG. 6 represents the angle of observation. The vertical axis of FIG. 6 represents the magnetic field strength attenuation effect in decibels. In FIG. 6, the magnetic field strength attenuation effect for three cases; d=0.89 m, d=0.44 m and d=0.22 m are shown. By referring to FIG. 6, it is inferred that the shorter the distance d is, the greater the magnetic field strength attenuation effect becomes.

If the phases of the currents flowing in the inductor 2a and the inductor 2b are opposite, the phase of the magnetic field generated by the inductor 2a and the phase of the magnetic field generated by the inductor 2b become opposite as well. By generating magnetic fields with opposite phases, it is possible to make the magnetic fields cancel with each other, weakening the strength of leakage magnetic field. Therefore, by configuring the distance d to a small value and making the inductors 2a and 2b generate magnetic fields with opposite phases, it is possible to reduce the leakage magnetic flux. The inductors are located adjacently to reduce the leakage magnetic flux in the plan view diagram of FIG. 7. The angle $\Phi$ is configured to approximately 60 degrees in the example of FIG. 7.

In the following, the magnetic flux (magnetic field) which reaches regions beyond the inductor unit in the opposite side is called the leakage magnetic flux (leakage magnetic field).

From the transmitting side, the inductor unit in the opposite side is the inductor unit in the receiving side. From the receiving side, the inductor unit in the opposite side is the inductor unit in the transmitting side. The leakage magnetic flux (leakage magnetic field) does not contribute to transmission of electric power. Generally, lesser the generation of the leakage magnetic flux is in the inductor, the more efficient the non-contact power supplying system becomes.

In one embodiment, the direction the coils are winded are opposite in a pair of inductors. Thereby, it is possible to generate magnetic fields with opposite phases. In such cases, it is possible to cancel the leakage magnetic fluxes despite the fact the currents provided to the inductors are same phases.

Figure 7:
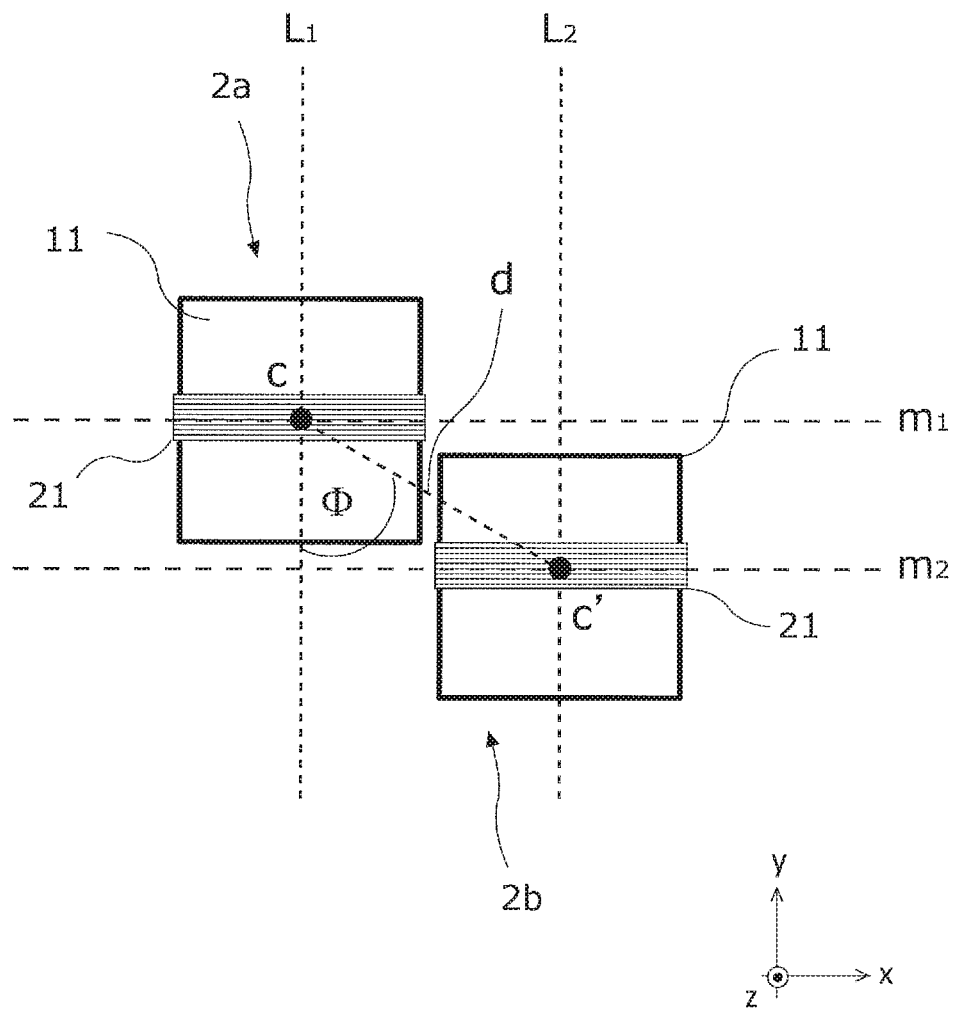
FIG. 7 is a plan view of a case where inductors are located adjacently.

In the example of FIG. 7, both the inductor 2a and the inductor 2b are approximately plan view rectangular-shaped. Due to physical restrictions, it is difficult to make the distance d shorter.

Figure 8:
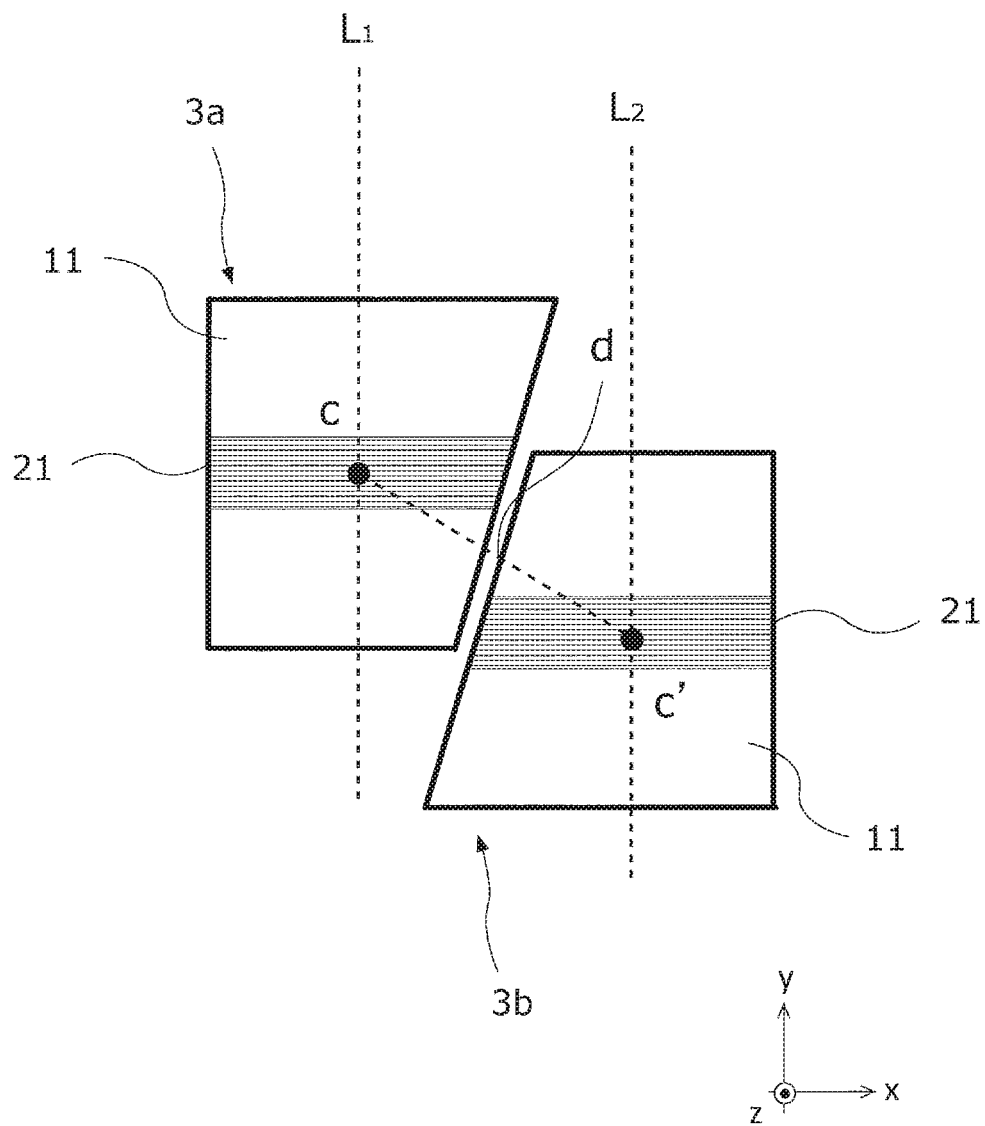
FIG. 8 is a plan view of a combination of inductors with sides of certain angles.

In order to make the distance d between the points c-c' shorter, it is possible to change the shapes of the magnetic cores of the inductors. The plan view diagram of FIG. 8 is a combination of inductors (an inductor unit). For each inductor in FIG. 8, there is one side with an angle between the length direction. In the example of FIG. 8, a side of the inductor 2a which faces a side of the inductor 2b is not approximately parallel to the broken line $L_1$. Instead, there is a second angle between the side of the inductor 2a and the broken line $L_1$. Similarly, a side of the inductor 2b which faces a side of the inductor 2a is not approximately parallel to the broken line $L_2$. Instead, there is a third angle between the side of the inductor 2b and the broken line $L_2$. The second angle and the third angle are approximately equal. By adopting such a configuration, it is possible to make the distance d between the points c-c' shorter. Thus, it is possible to make the attenuation effect of leakage magnetic field stronger.

Figure 9:
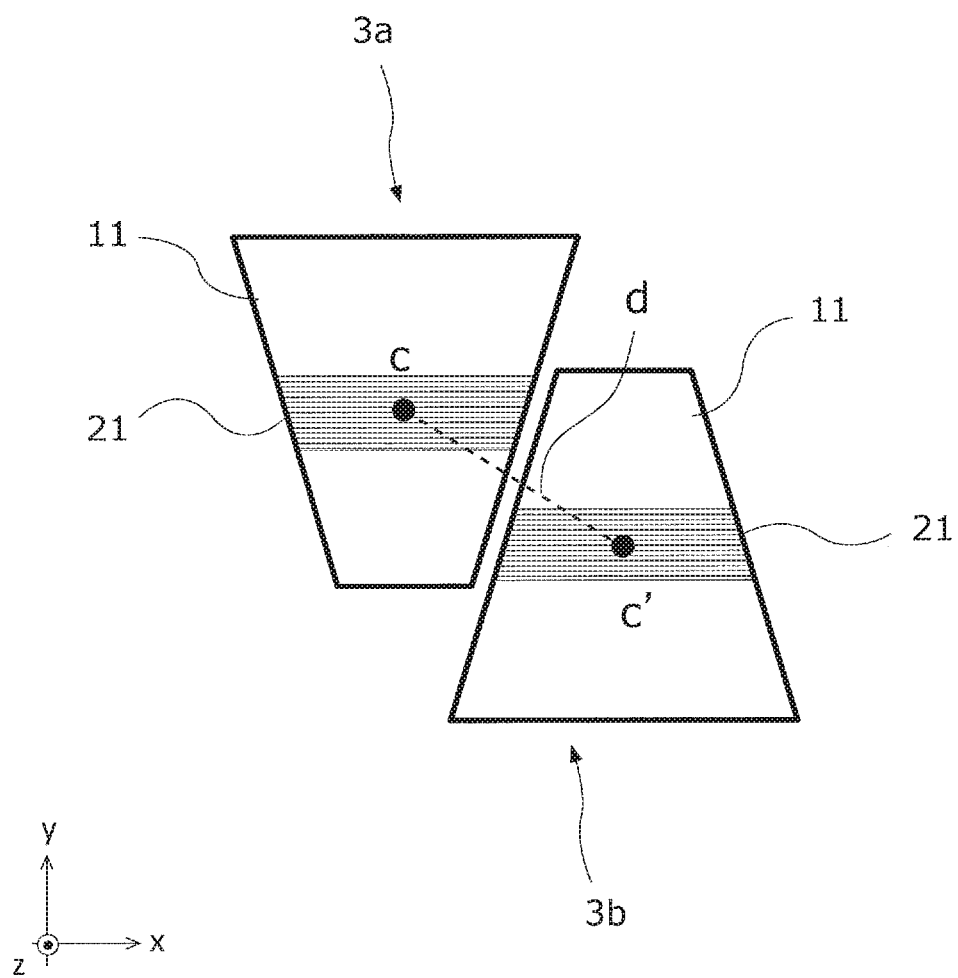
FIG. 9 is a plan view of a combination of inductors which are approximately trapezoidal shaped.

FIG. 9 is a plan view of a combination of inductors which are approximately trapezoidal shaped. It is possible to make the distance d between the points c-c' shorter by combining inductors which are approximately plan view trapezoidal shaped.

Figure 10:
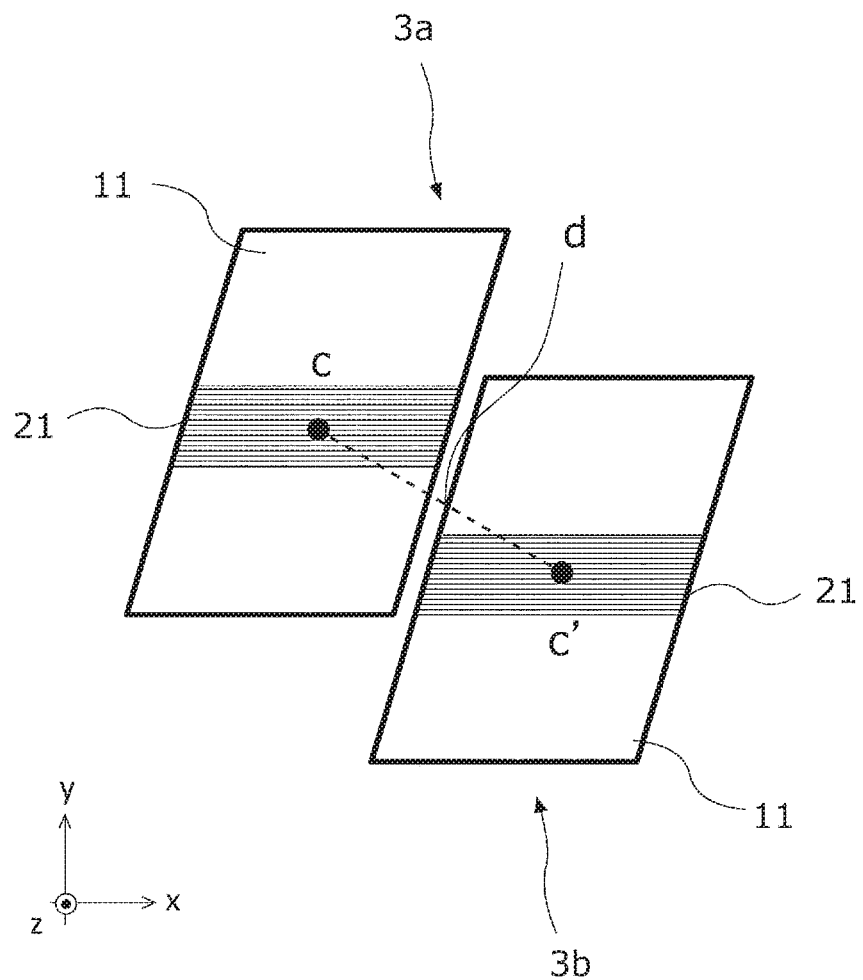
FIG. 10 is a plan view of a combination of inductors which are approximately parallelogram shaped.

FIG. 10 is a plan view of a combination of inductors which are approximately parallelogram shaped. It is possible to make the distance d between the points c-c' shorter by combining inductors which are approximately plan view parallelogram shaped.

Figure 11:
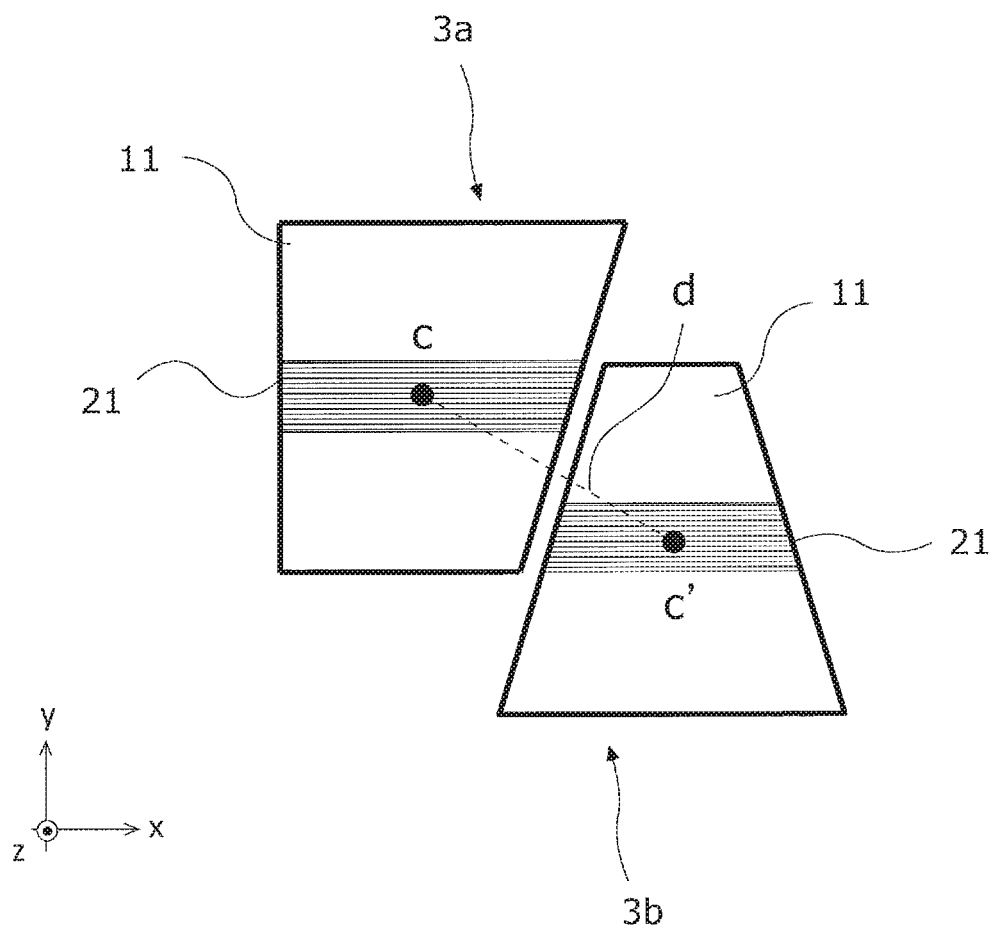
FIG. 11 is a plan view of a combination of inductors with different shapes.
Figure 12:
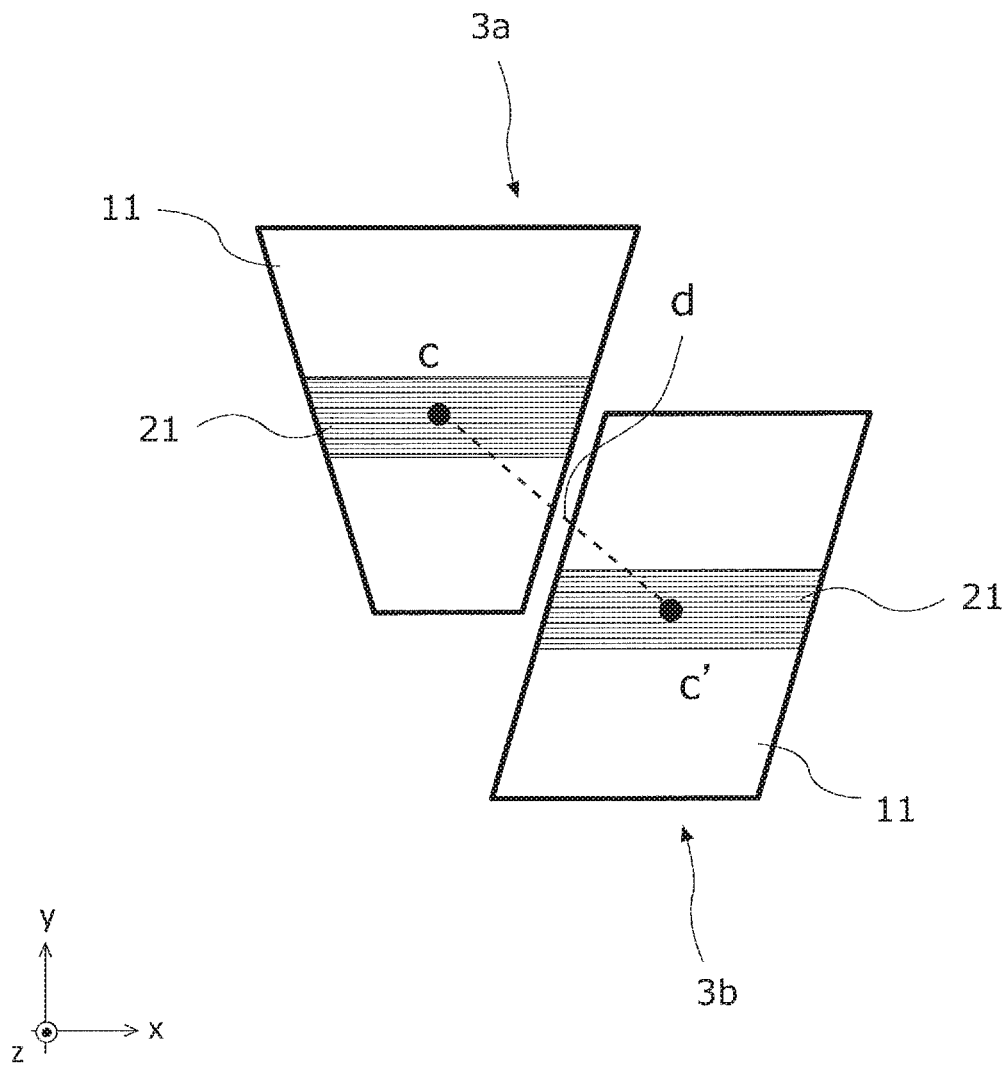
FIG. 12 is a plan view of a combination of inductors with different shapes.

FIG. 11 and FIG. 12 are plan views of a combination of inductors with different shapes. In FIG. 11, an inductor 3a and an inductor 3b are both approximately plan view trapezoidal shaped. However, the shapes of the inductor 3a and the inductor 3b are asymmetric. In FIG. 12, the inductor 3a is approximately plan view trapezoidal shaped while the inductor 3b is approximately plan view parallelogram shaped. By adopting the configurations of FIG. 11 and FIG. 12, it is possible to make the distance d between the points c-c' shorter. Thus, it is possible to make the attenuation effect of leakage magnetic field stronger.

In the inductor units of FIG. 9 and FIG. 12, the second angle and the third angle are approximately equal. Thus, the attenuation effect of leakage magnetic field is strong. It is possible to use different configuration to make the distance d between the points c-c' shorter.

Figure 13:
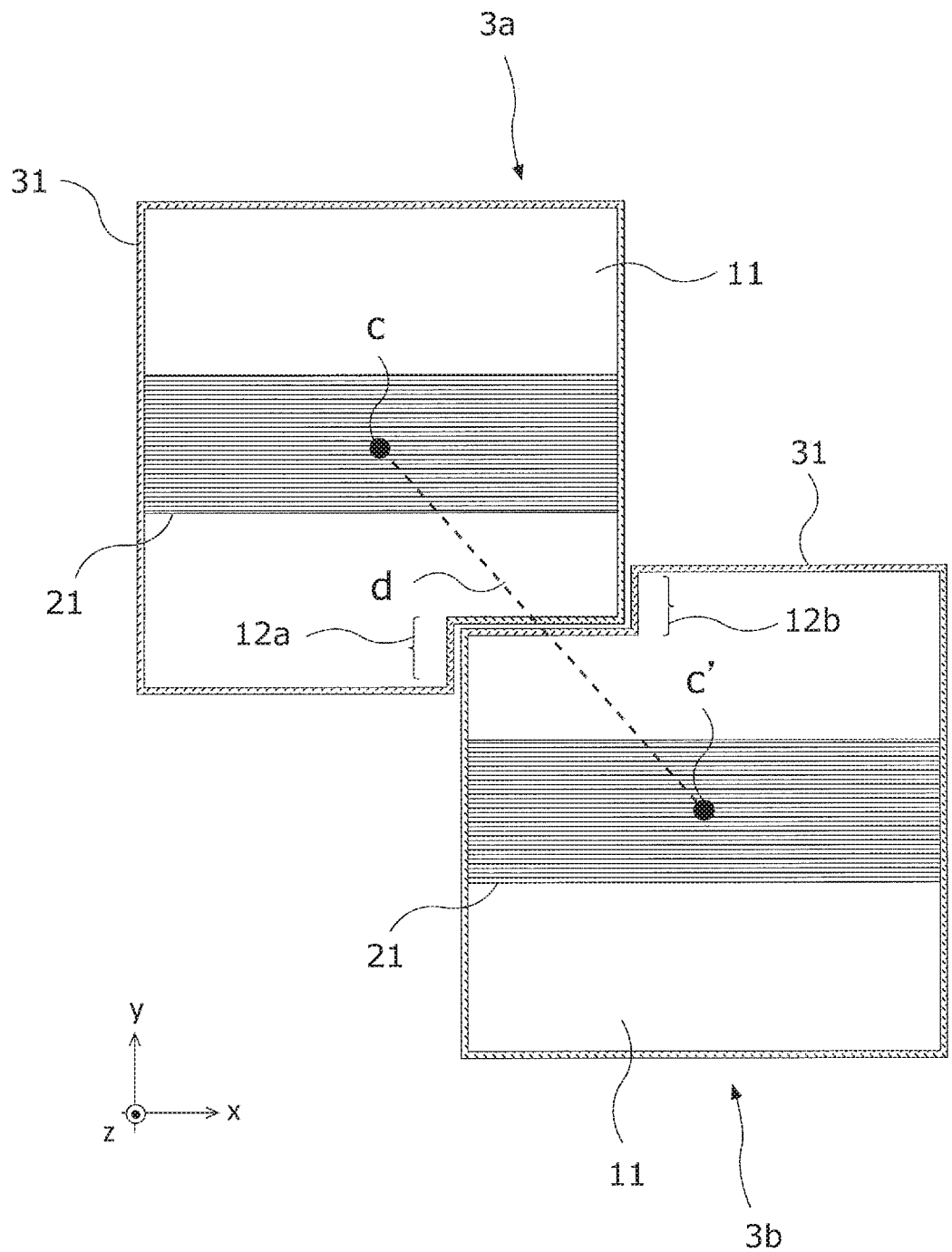
FIG. 13 is a plan view of a combination of inductors which can fit with each other in the outer circumference.
Figure 14:
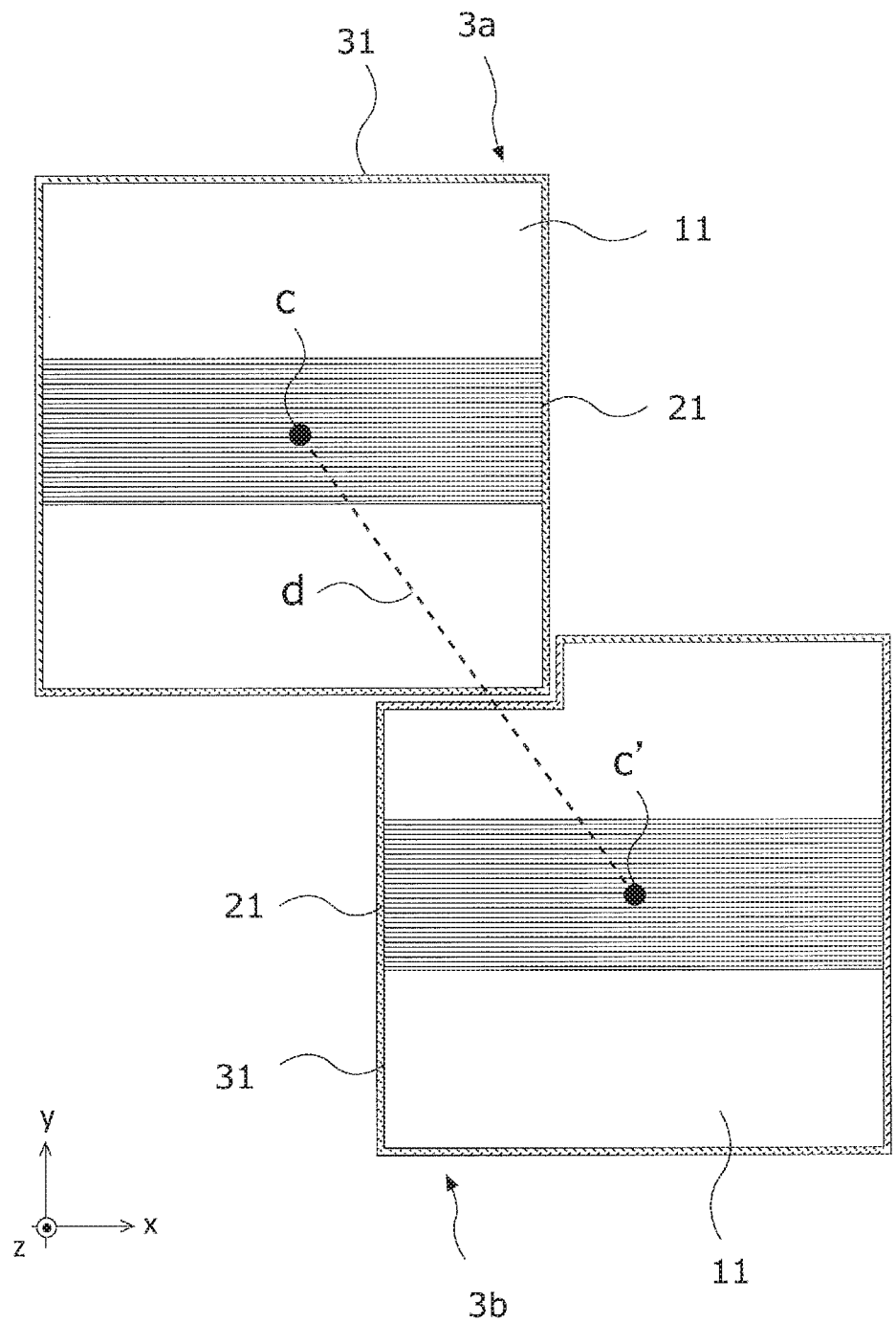
FIG. 14 is a plan view of a combination of inductors which can fit with each other in the outer circumference.

In the aforementioned examples, the inductors were approximately hexahedral shaped. However, the shapes of the inductors do not necessary have to be approximately hexahedral shaped. FIG. 13 and FIG. 14 are plan views of combinations of inductors (inductor units) which can fit with each other in the outer circumference. The inductors 3a and 3b in FIG. 13 are not perfectly plan view parallelogram shaped. The inductors 3a and 3b have concaved regions in the outer circumference. In the example of FIG. 13, the concaved region 12a of the inductor 3a and the concaved region 12b of the inductor 3b are shaped so that they could fit with each other.

Figure 15:
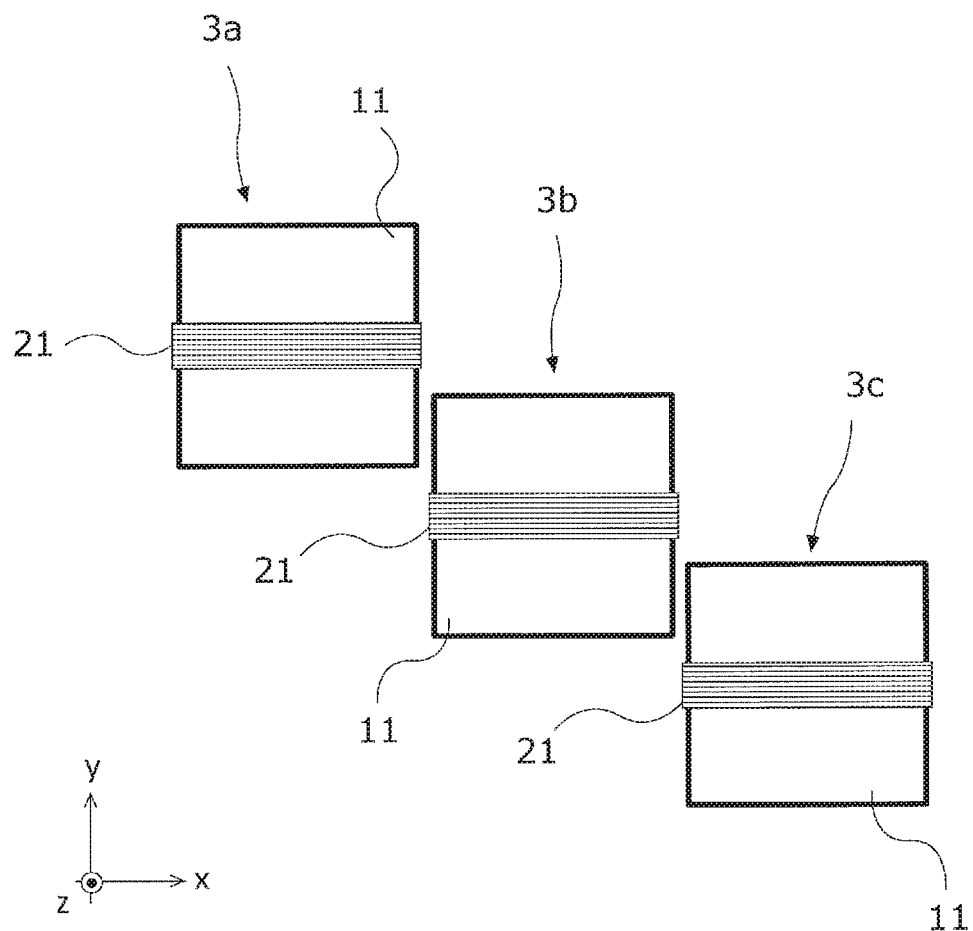
FIG. 15 is a plan view of three inductors located adjacently.

In one embodiment, the number of inductors in an inductor unit is equal to or greater than three. FIG. 15 is a plan view of three inductors located adjacently. The inductors 3a, 3b and 3c in FIG. 15 are approximately plan view parallelogram shaped.

Figure 16:
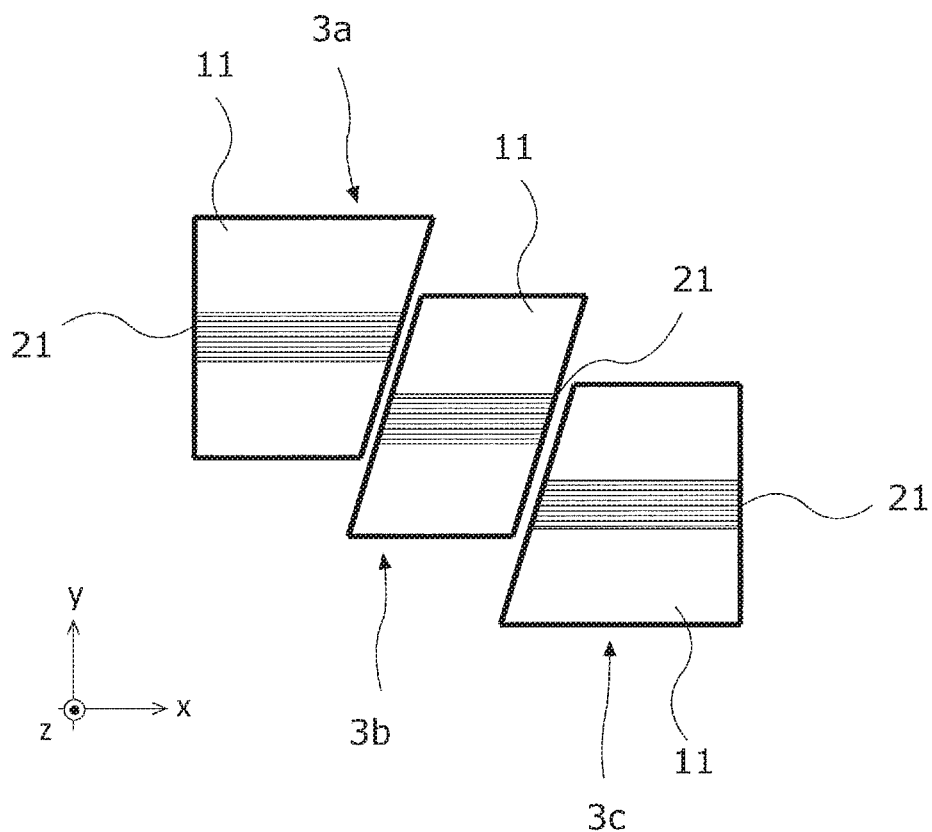
FIG. 16 is a view of three inductors with sides of certain angles.

In the plan view diagram of FIG. 16, the sides of the inductors have an angle between the length directions of the inductors. The inductor unit in FIG. 16 includes three inductors 3a, 3b and 3c. The inductors 3a and 3c are approximately plan view trapezoidal shaped. The inductor 3b is approximately plan view parallelogram shaped. The angle between the side of the inductor 3a which faces the inductor 3b and the y-axis is approximately equal to the angle between the side of the inductor 3b which faces the inductor 3a and the y-axis. Similarly, the angle between the side of the inductor 3b which faces the inductor 3c and the y-axis is approximately equal to the angle between the side of the inductor 3c which faces the inductor 3b and the y-axis. By using the aforementioned configuration, it is possible to make the attenuation effect of leakage magnetic field stronger for cases when there are three or more inductors combined in the same side.

Second Embodiment

In order to manufacture inductors which are capable of transmitting and receiving high powers, large magnetic cores have to be prepared. If magnetic cores of different shapes need to be prepared to make the attenuation effect of leakage magnetic field stronger, there are risks of increasing manufacturing costs. Therefore, by combining a plurality of block cores, it is possible to form the magnetic cores of the inductors. The block cores are small blocks formed from magnetic substances.

The shape of the block cores is not limited. Examples of the shape of the block cores include approximately hexagonal prism shapes and approximately hexahedral shapes. Also, the size of the block cores and the aspect ratios are not limited. In the second embodiment, a case when approximately flat-plate shaped (tile shaped) block cores are used is described.

Figure 17:
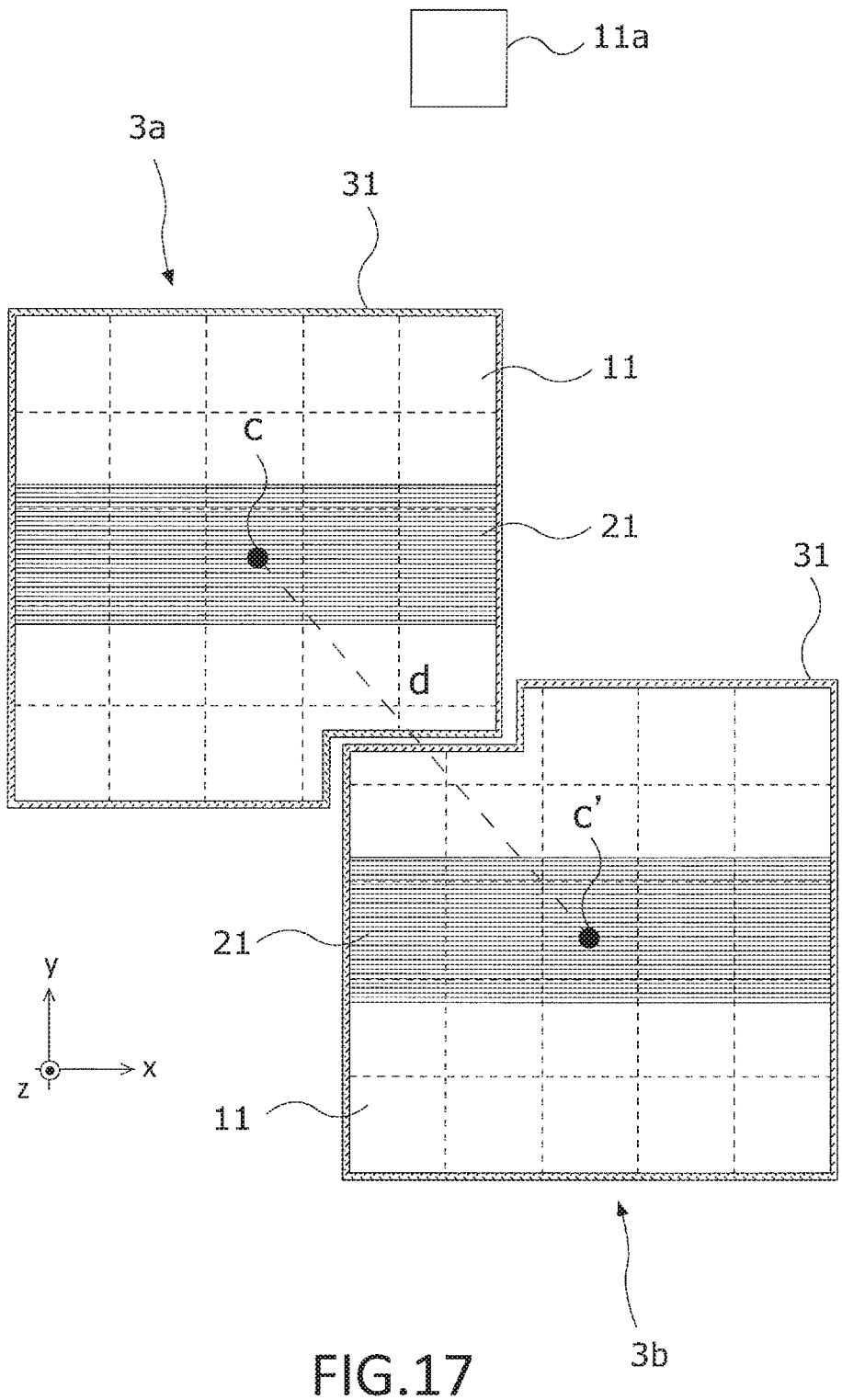
FIG. 17 is a plan view of a combination of inductors including block cores.
Figure 18:
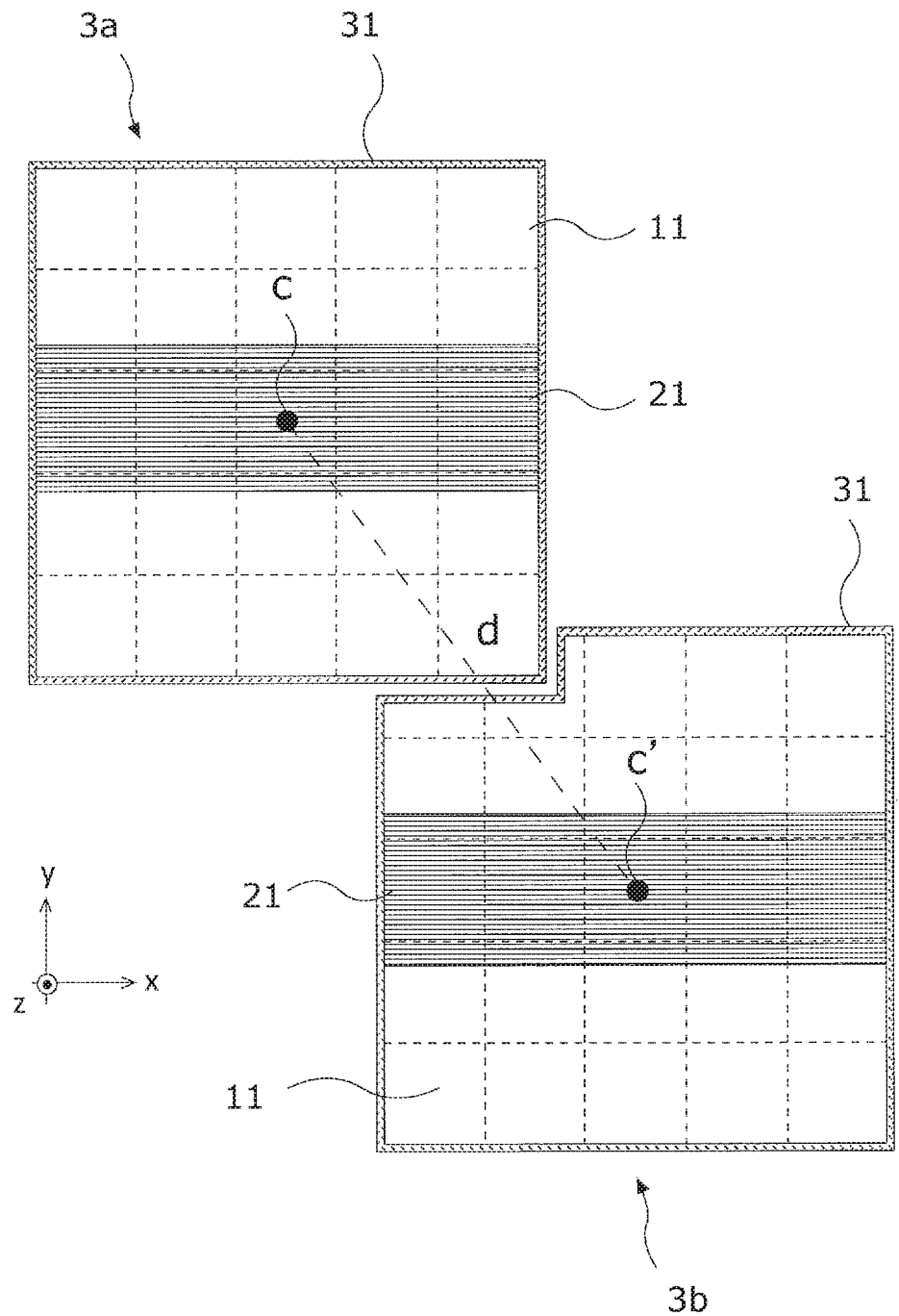
FIG. 18 is a plan view of a combination of inductors including block cores.

FIG. 17 and FIG. 18 are plan views of combinations of inductors including block cores. Magnetic cores 11 in the inductors 3a and 3b of FIG. 17 and FIG. 18 are formed by combining a plurality of block cores 11a. Besides the fact that a combination of a plurality of block cores 11a is used, the configuration of the inductors are similar to that of the inductors represented in FIG. 13 and FIG. 14.

Figure 19:
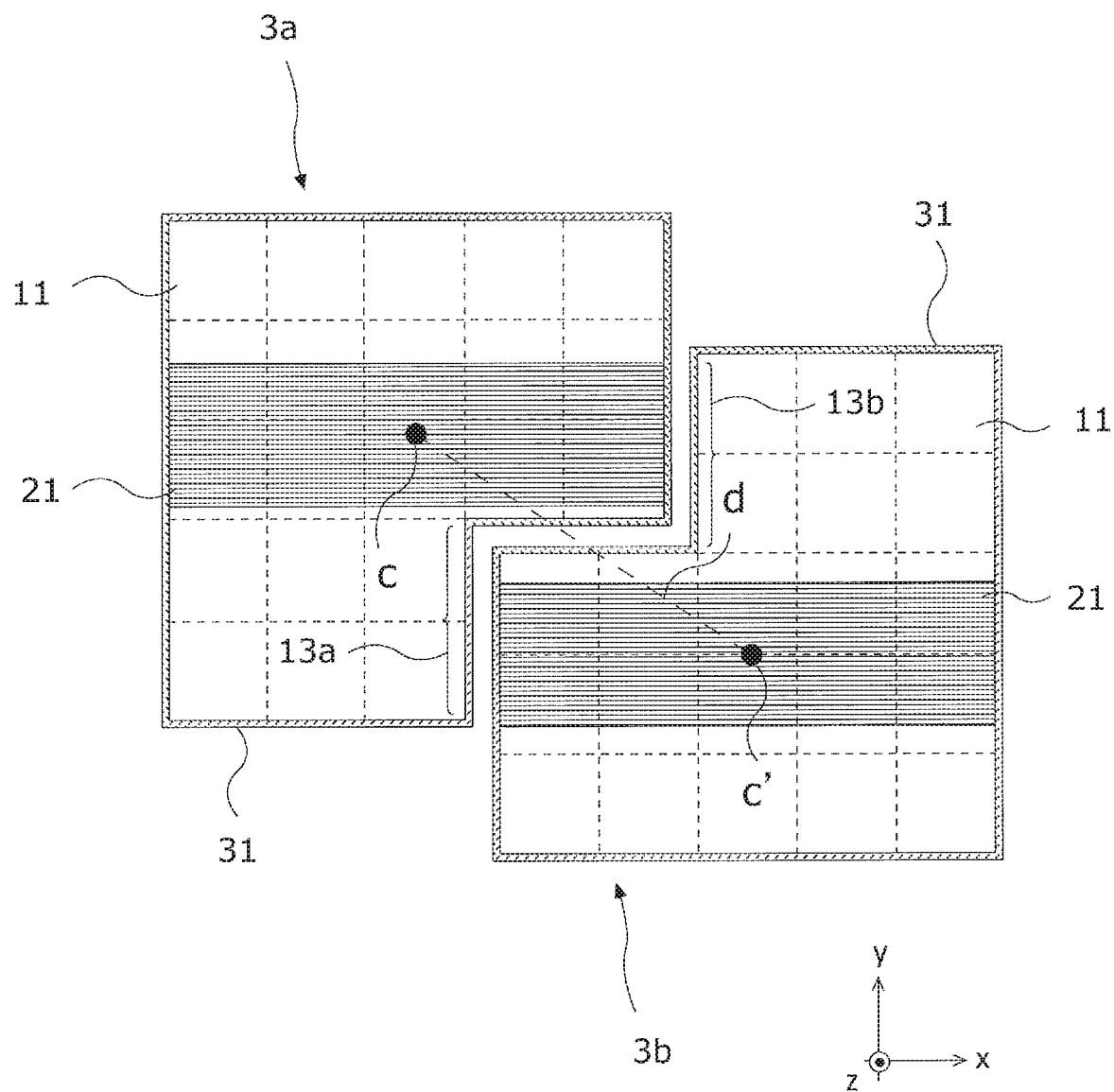
FIG. 19 is a plan view of a combination of inductors including block cores.
Figure 20:
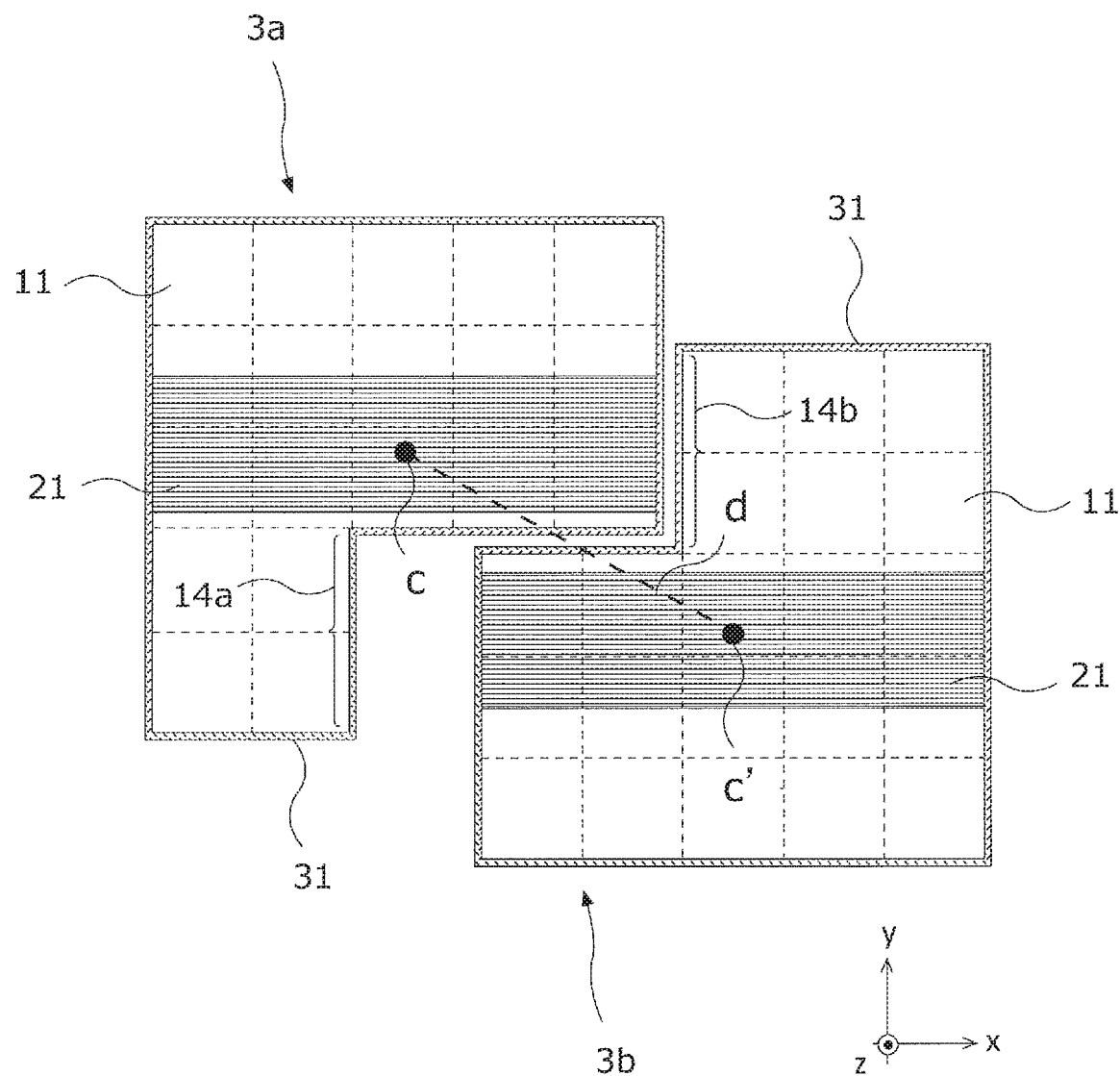
FIG. 20 is a plan view of a combination of inductors including block cores.

The plan view diagrams in FIG. 19 and FIG. 20 represent combinations of inductors with large concave portions in the outer circumference. The magnetic cores 11 in the inductors 3a and 3b of FIG. 17 and FIG. 18 are formed by combining a plurality of block cores 11a. The inductor 3a in FIG. 19 has a concave portion 13a in the outer circumference. The inductor 3b in FIG. 19 has a concave portion 13b in the outer circumference. The concave portions 13a and 13b both have areas equal to four block cores observed from the plan view. Therefore, the areas of the concave portions are greater than the examples in FIG. 13 and FIG. 14.

The inductor 3a in FIG. 20 has a concave portion 14a in the other circumference. Also, the inductor 3b in FIG. 20 has a concave portion 14b in the other circumference. The concave portion 14a has an area equal to approximately 6 block cores observed from plan view. The concave portion 14b has an area equal to approximately 4 block cores from plan view. Therefore, in one embodiment, the area of the concave portions in each inductor is different. Also, in one embodiment, the shapes of the outer circumference of the combined inductors do not fit completely.

Figure 21:
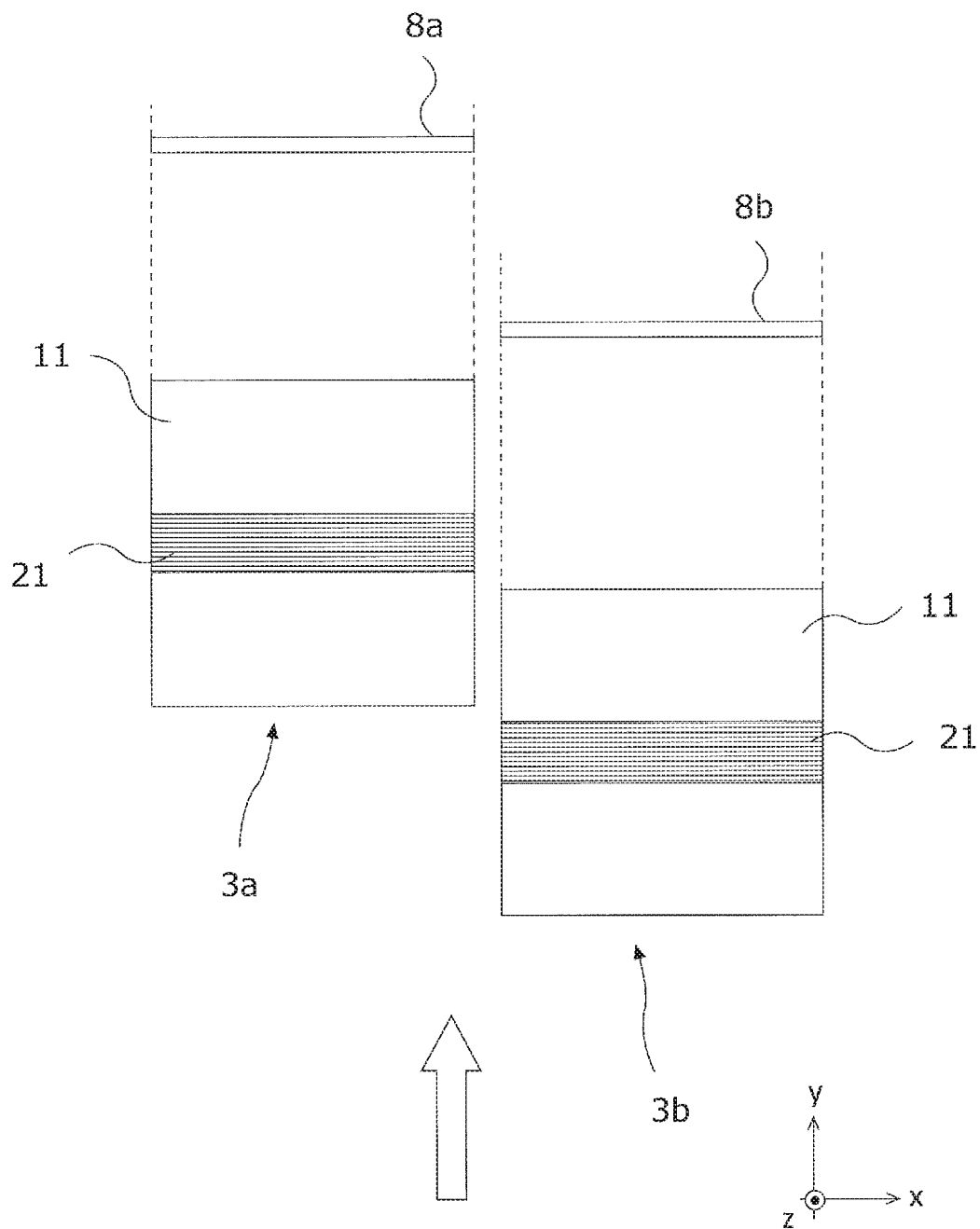
FIG. 21 is a diagram of a combination of inductors without overlaps of coils in width direction.

FIG. 21 is a diagram of a combination of inductors without overlaps of coils in the width direction. In the example of FIG. 21, light is emitted from the y-axis negative direction to the y-axis positive direction. The direction of the emitted light is perpendicular to the direction the coil 21 is winded. A shade 8a is a shade projected from the inductor 3a which is approximately plan view parallelogram shaped. A shade 8b is a shade projected from the inductor 3b which is approximately plan view parallelogram shaped. In the example of FIG. 21, the shades 8a and 8b do not overlap.

Figure 22:
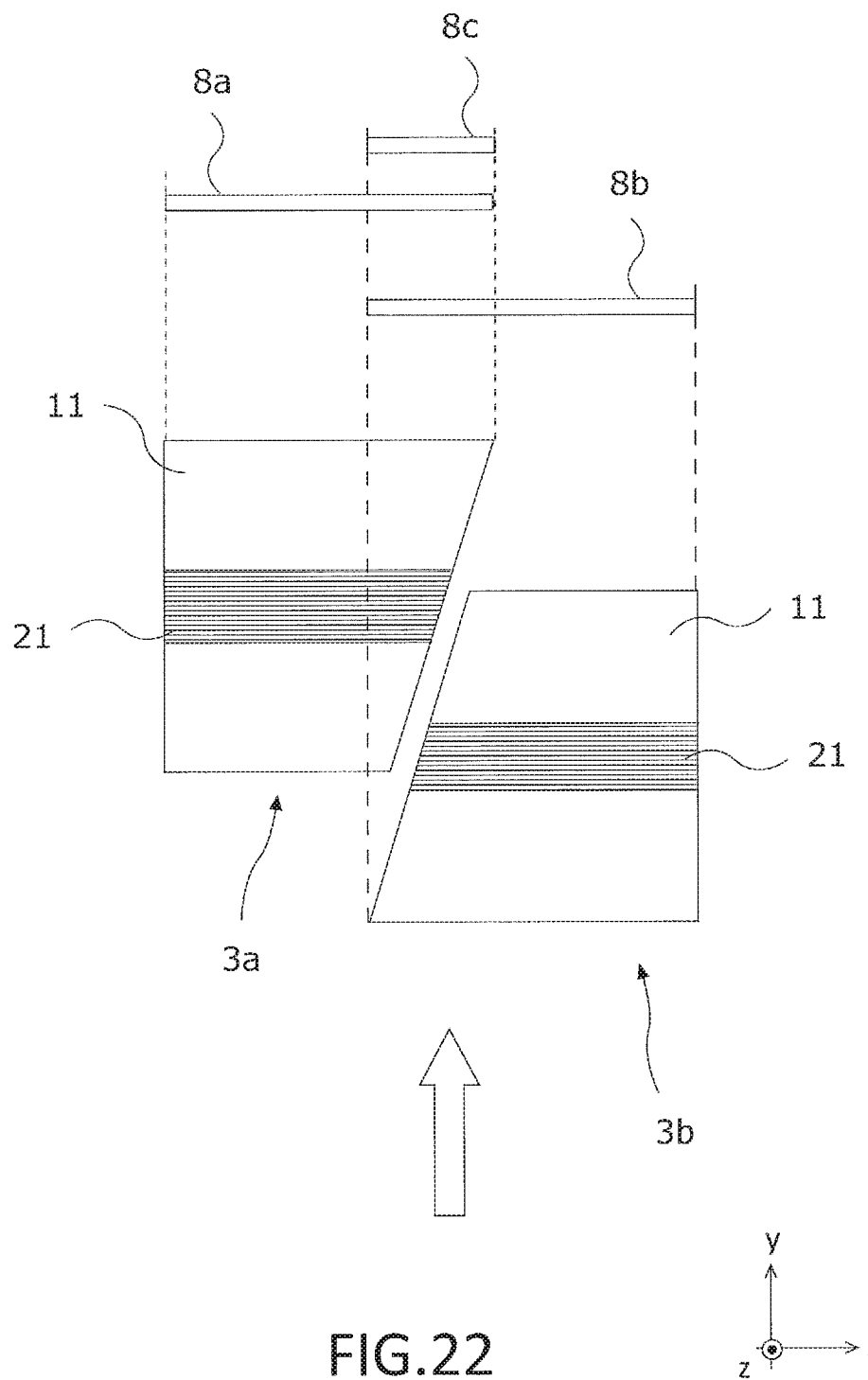
FIG. 22 is a diagram of a combination of inductors with overlaps of coils in width direction.

FIG. 22 is a diagram of a combination of inductors with overlaps of coils in width direction. In the example of FIG. 22, light is emitted from the y-axis negative direction to the y-axis positive direction. The direction of the emitted light is perpendicular to the direction the coil 21 is winded. The shade 8a is a shade projected from the inductor 3a which is approximately plan view trapezoidal shaped. A shade 8b is a shade projected from the inductor 3b which is approximately plan view trapezoidal shaped. The shades 8a and 8b have an overlapping area 8c. As shown in the example of FIG. 22, in one embodiment, the cross-section of the coils in the width direction is overlapping when observed from the length direction of the inductor (y-axis direction).

Therefore, in the embodiment, the cross section of the coil 21 (first coil) of the inductor 3a (first inductor) in the width direction and the cross section of the coil 21 (second coil) of the inductor 3b (second inductor) in the width direction overlap in at least the direction of the first magnetic flux generated in the magnetic core 11 (first magnetic core) of the inductor 3a (first inductor) or the direction of the second magnetic flux generated in the magnetic core 11 (second magnetic core) of the inductor 3b (second inductor). By adopting such a configuration, it is possible to shorten the distance d between the inductors thereby making the attenuation effect of leakage magnetic field stronger.

Third Embodiment

In the second embodiment, examples of magnetic cores formed from a combination of a plurality of block cores were described. In the examples of FIG. 17 to FIG. 20, the width of the coils (wires) winded around the inductor were constant. However, the width of the coils winded around the inductor does not have to be always constant.

Figure 23:
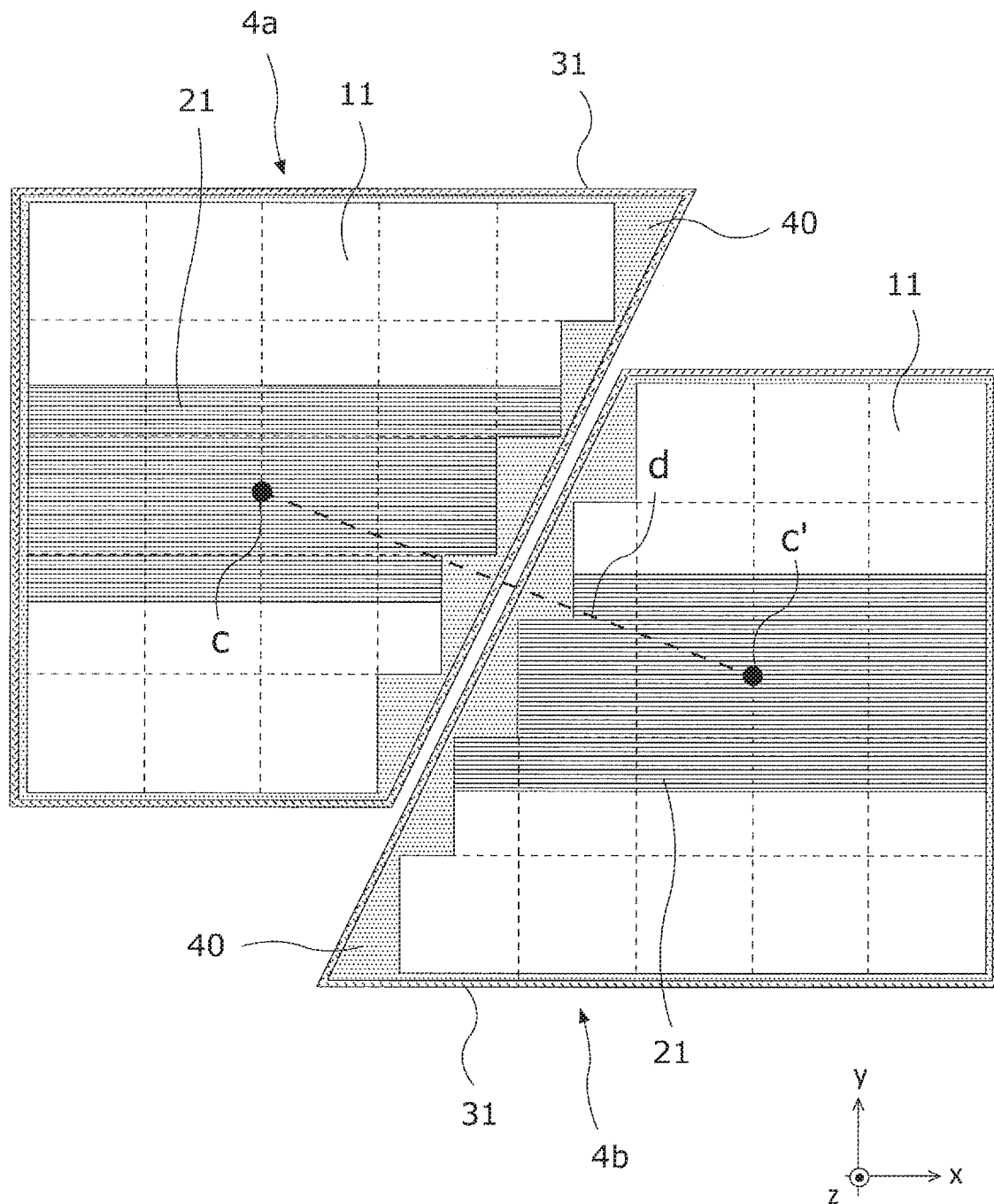
FIG. 23 is a plan view of a first example of a combination of inductors with coils of non-constant width.

FIG. 23 is a plan view of a first example of a combination of inductors with coils of non-constant width. The inductor unit in FIG. 23 includes an inductor 4a and an inductor 4b which are approximately plan view trapezoidal shaped. The magnetic cores 11 of the inductor 4a and the inductor 4b are formed by combining a plurality of block cores 11a. In the inductors 4a and 4b, the width of the magnetic core 11 is changing step-wise in the length direction. Therefore, the width of the coil 21 winded around the magnetic core 11 is also is changing step-wise in the length direction. The magnetic cores 11 and the coils 21 of the inductors 4a and 4b are installed in a casing 31 which is approximately plan view trapezoidal shaped. In one embodiment, the space between the casing 31 and the combination of the magnetic core 11 plus the coil 21 is enclosed with a filling material 40.

Figure 24:
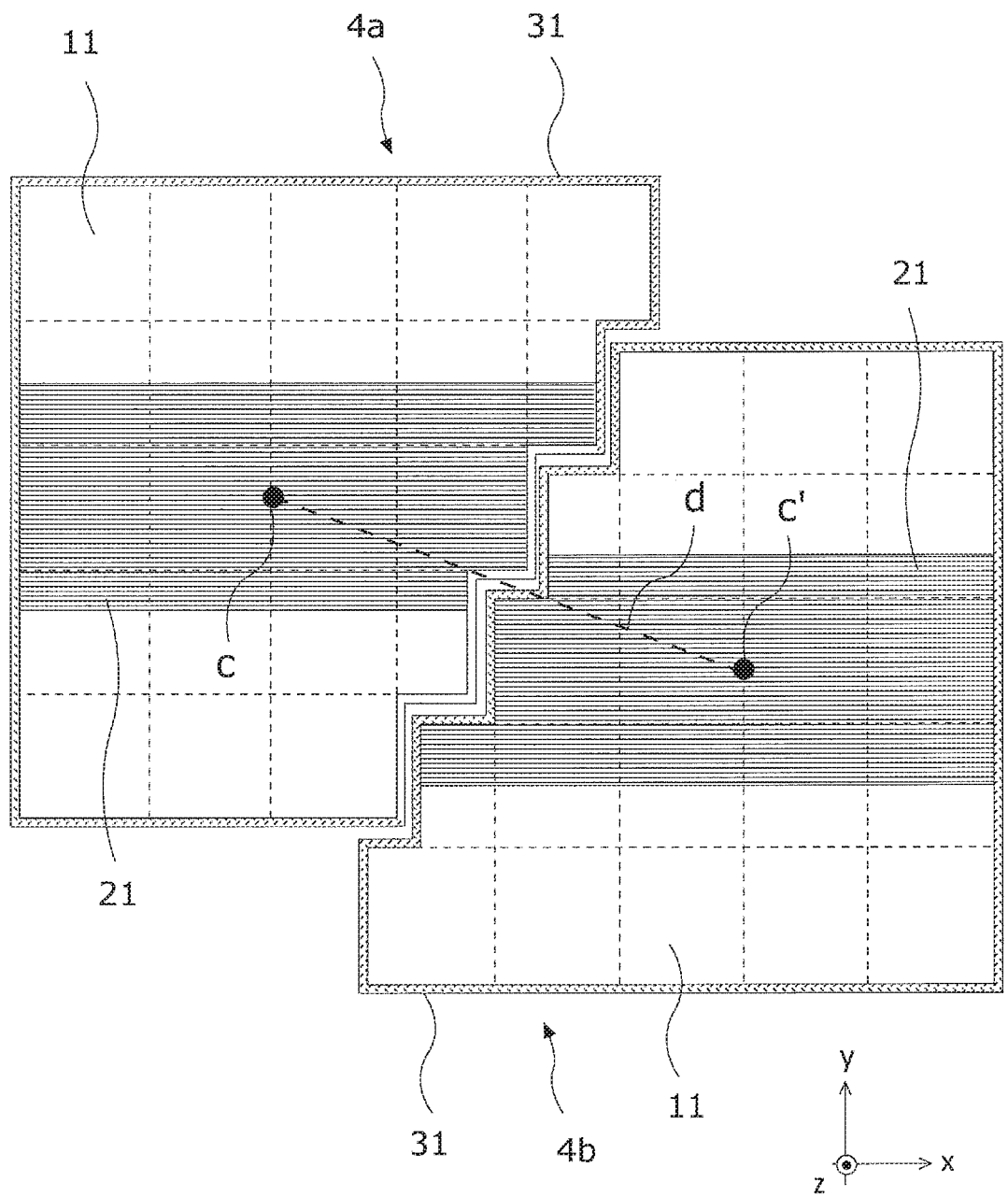
FIG. 24 is a plan view of a second example of a combination of inductors with coils of non-constant width.

FIG. 24 is a plan view of a second example of a combination of inductors with coils of non-constant width. FIG. 24 includes an inductor unit including the inductor 4a and the inductor 4b which are shaped so that the first inductor and the second inductor can fit with each other in the outer circumference. In FIG. 24, the magnetic cores 11 of the inductors 4a and 4b are formed by combining a plurality of block cores. In the inductors 4a and 4b, the width of the magnetic core 11 is changing step-wise in the length direction. Therefore, the width of the coil 21 winded around the magnetic core 11 is also is changing step-wise in the length direction. The magnetic cores 11 and the coils 21 of the inductors 4a and 4b are installed in a casing 31. In one embodiment, the space between the casing 31 and the combination of the magnetic core 11 plus the coil 21 is enclosed with a filling material 40.

Figure 25:
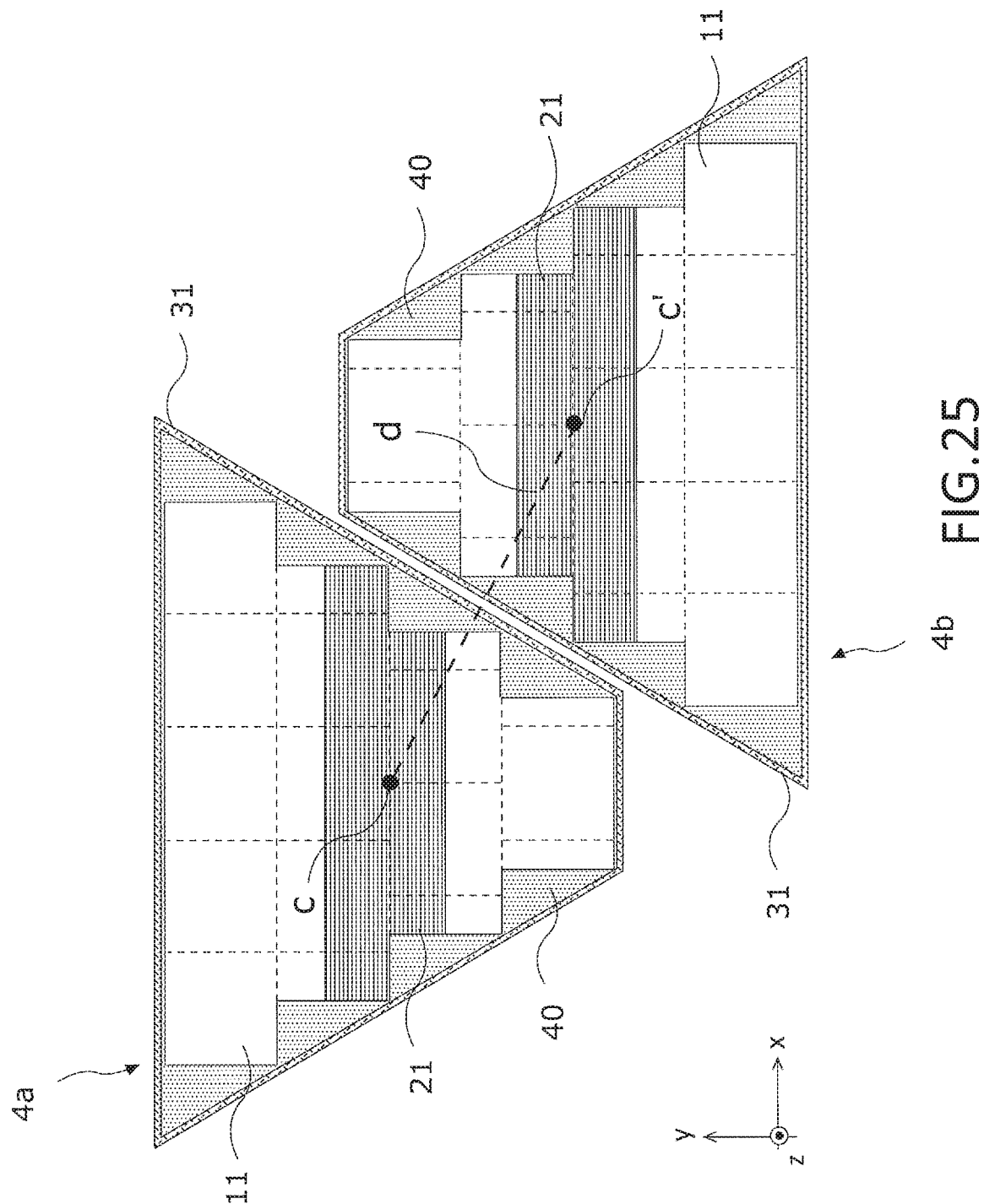
FIG. 25 is a plan view of a third example of a combination of inductors with coils of non-constant width.

FIG. 25 is a plan view of a third example of a combination of inductors with coils of non-constant width. The inductor unit in FIG. 25 includes an inductor 4a and an inductor 4b which are approximately plan view trapezoidal shaped. The magnetic core 11 of the inductors 4a and 4b are formed by combining a plurality of block cores 11a. In the inductors 4a and 4b, the width of the magnetic core 11 is changing step-wise in the length direction. Therefore, the width of the coil 21 winded around the magnetic core 11 is also is changing step-wise in the length direction. The magnetic cores 11 and the coils 21 of the inductors 4a and 4b are installed in a casing 31 which is approximately plan view trapezoidal shaped. In one embodiment, the space between the casing 31 and the combination of the magnetic core 11 plus the coil 21 is enclosed with a filling material 40.

As described in the examples of FIG. 23 to FIG. 25, it is possible to reduce the distance d between the inductors (points c-c') by using coils with non-constant widths in the length direction. Thereby, it is possible to make the attenuation effect of leakage magnetic field stronger.

It is possible to define points c and c' in cases when the shape of the coil 21 observed from the plan view is asymmetrical as in the examples of FIG. 23 and FIG. 24. For example, in one embodiment, the intersection of a line which passes through the center of the coil in the maximum width and a line which passes through the center of the coil in the length direction is defined as points c and C.

Fourth Embodiment

In the combination of inductors described in the above embodiments, the magnetic cores belonging to different inductors were not overlapping in the thickness direction. However, in one embodiment, the magnetic cores belonging to different inductors are overlapping in the thickness direction. In the fourth embodiment, a case where parts of the magnetic cores belonging to different inductors are overlapping is described.

Figure 26:
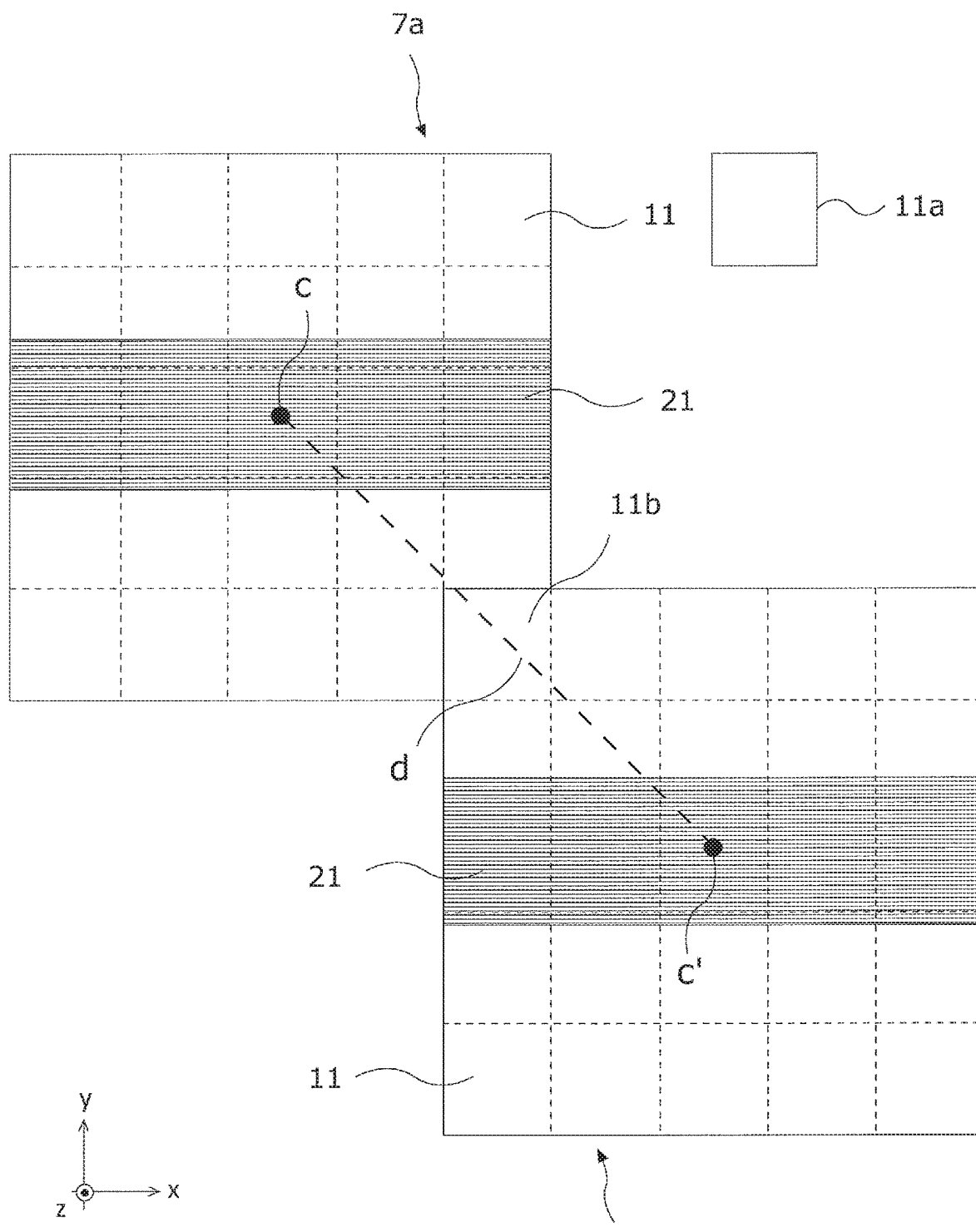
FIG. 26 is a diagram of a combination of inductors according to a fourth embodiment.

FIG. 26 is a diagram of a combination of inductors according to a fourth embodiment. The plan view diagram of FIG. 26 represents an inductor unit including an inductor 7a and an inductor 7b. Both inductors 7a and 7b are approximately plan view rectangular shaped. The magnetic cores 11 of the inductors 7a and 7b are formed by combining a plurality of block cores 11. A block core 11b belonging to the inductor 7a is stacked on a block core belonging to the inductor 7b.

Figure 27:
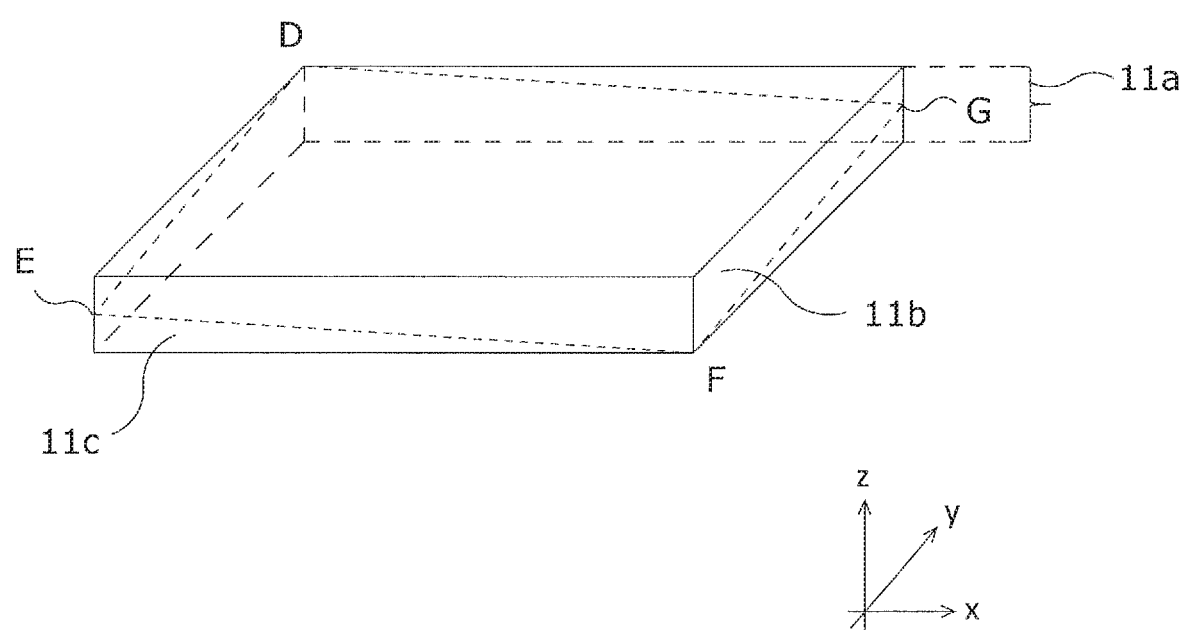
FIG. 27 is a perspective view of overlapping block cores.

FIG. 27 is a perspective view diagram which represents a magnified illustration of the block core 11b. The block core 11b of the inductor 7b is overlapping on the block core 11c which belongs to the inductor 7a. By cutting the block core 11a which is approximately flat plate shaped in a plain which includes the points D-E-F-G in FIG. 27, it is possible to form the shapes of the block core 11b and the block core 11c. The points D and F are the vertices of the block core 11a. The points E and G are the middle points of the ridgelines of the block core 11 in the thickness direction (z-axis direction).

The configuration of FIG. 26 and FIG. 27 are only examples. For example, in one embodiment, a plurality of block cores belonging to different inductors is stacked in the width direction. The number of the stacked (overlapping) block cores is not limited. In another embodiment, the block cores belonging to different inductors are stacked differently from the example in FIG. 27. For example, it is possible to stack two block cores with half the thickness of the block core 11a in the z-axis direction. Also, the magnetic core of the inductor does not necessary have to be formed with a combination of block cores.

By stacking part of the magnetic cores belonging to different inductors, it is possible to shorten the distance d between the inductors (points c-c'), thereby making the attenuation effect of leakage magnetic field stronger.

Fifth Embodiment

Above, inductors with magnetic cores of approximately plan view trapezoidal shapes and approximately plan view parallelogram shapes were described. Also, inductors with magnetic cores of non-constant width were explained. In the above cases, the vertices of magnetic core and the vertices of the inductors formed by the ridgelines may form acute angles depending on the configurations. For example, if the magnetic cores are approximately plan view trapezoidal shaped or approximately plan view parallelogram shaped, the magnetic cores have acute angles. Also, if the magnetic cores are formed by combining a plurality of block cores, the casing includes acute angles, depending on the configurations as shown in the examples of FIG. 23 and FIG. 24.

The installation environment and the location where the inductor and the non-contact power supply system are installed are not limited. Therefore, there are cases when the inductors receive shocks, tremors or stress. If there are acute angles in the magnetic cores or casing of inductors, the vicinity of the acute angles may become broken. In the fifth embodiment, an inductor with higher durability is explained.

Figure 28:
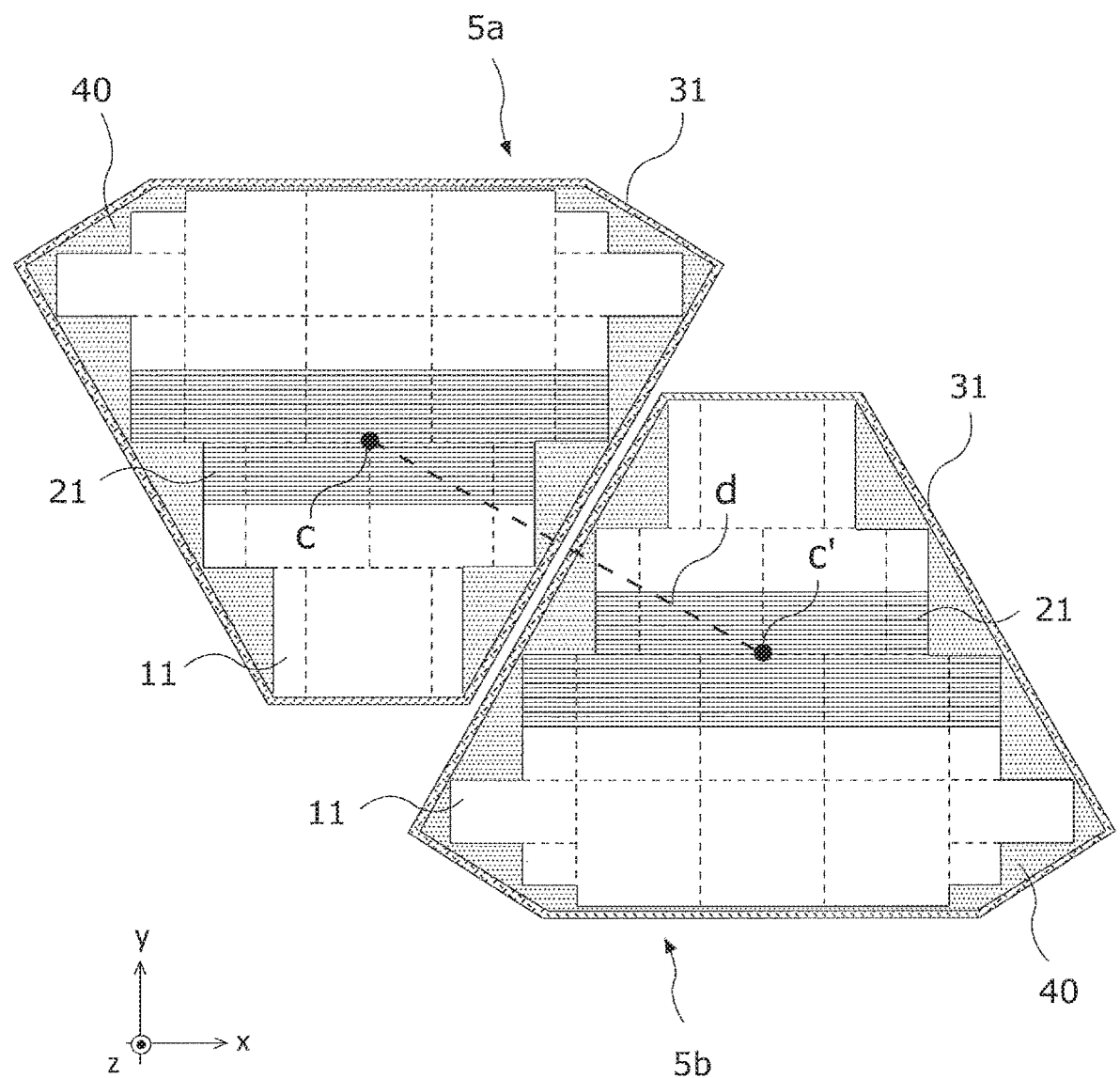
FIG. 28 is a plan view of a combination of inductors with interior angles which are obtuse.

FIG. 28 is a plan view of a combination of inductors with interior angles which are obtuse. FIG. 28 includes inductors 5a and 5b which are approximately plan view hexagonal shaped. In the example of FIG. 28, magnetic cores 11 are formed by combining a plurality of block cores. In the magnetic cores 11 of the inductors 5a and 5b, it is possible to combine block cores of different shapes to install both the magnetic core 11 and the coil 21 to a casing 31 without acute angles. Thus, in one embodiment, block cores of various shapes and sizes are combined to form the magnetic core 11. In one embodiment, the space between the casing 31 and the combination of the magnetic core 11 plus the coil 21 is enclosed with a filling material 40.

By adopting the configuration of FIG. 28, it is possible to make the distance d between the inductors (points c-c') shorter, thereby making the attenuation effect of leakage magnetic field stronger.

Sixth Embodiment

In the above embodiments, cases when a combination of inductors including two inductors was located in the same side (receiving side or transmitting side) were explained. However, for the sake of transmitting and receiving high power and for cases rapid charging of secondary batteries is necessary, it is possible to place four or more inductors in the same side when configuring the non-contact power supply system. In the sixth embodiment, a configuration including four or more inductors in each inductor unit is explained. In the sixth embodiment, transmission and reception of high power is realized while the generation of the leakage magnetic field is reduced.

If a plurality of inductors is combined in the same side (primary side: receiving side or secondary side: transmitting side) the risk that the strength of the magnetic field leaking to the environment may become higher. In order to prevent this risk, pairs of inductors with phase differences are radians (opposite phases) are generated within the combination of inductors belonging to the same side. To ensure that the leakage magnetic field (leakage magnetic flux) generated from inductors belonging to the same pair are canceled, the inductors belonging to the same pair are aligned along an approximately same line. In the following, few examples are described.

Figure 29:
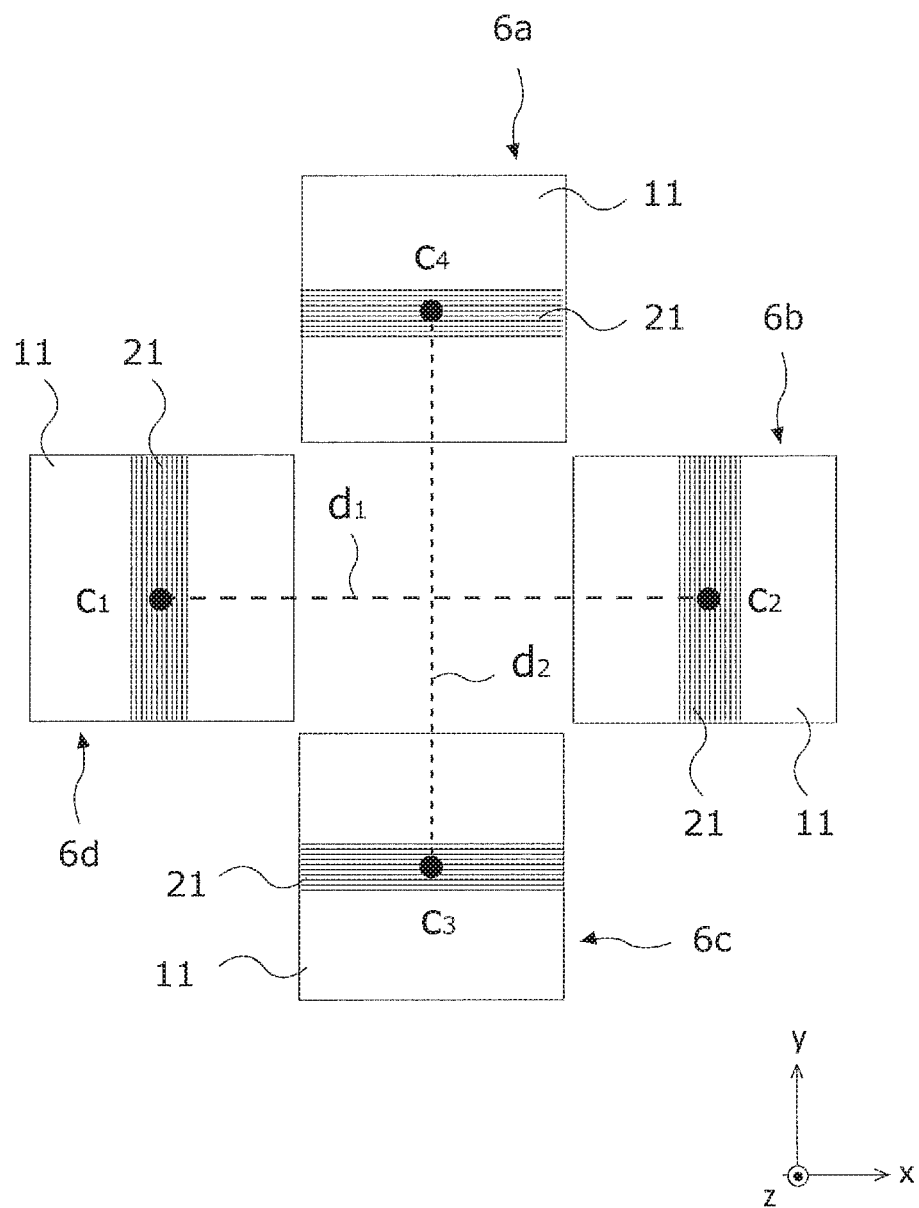
FIG. 29 is a plan view of four inductors combined in the same side.

FIG. 29 is a plan view of four inductors combined in the same side. The example of FIG. 29 includes inductors 6a to 6d which are approximately plan view parallelogram shaped. The inductor 6a forms a pair with the inductor 6c which is aligned along the approximately same line in the length direction (y-axis direction). Therefore, currents of opposite phases flow in the inductor 6a and the inductor 6c. Similarly, the inductor 6b forms a pair with the inductor 6d which is aligned along the approximately same line in the width direction (x-axis direction). Currents of opposite phases flow in the inductor 6b and the inductor 6d.

The distance between the inductor 6a (point $c_4$) and the inductor 6c (point $c_3$) of the first pair is $d_2$. The distance between the inductor 6b (point $c_2$) and the inductor 6d (point $c_1$) of the first pair is $d_1$. Similar to the distance d in the first embodiment, the shorter the distances $d_1$ and $d_2$ are, the stronger the attenuation effect of leakage magnetic field becomes.

Figure 30:
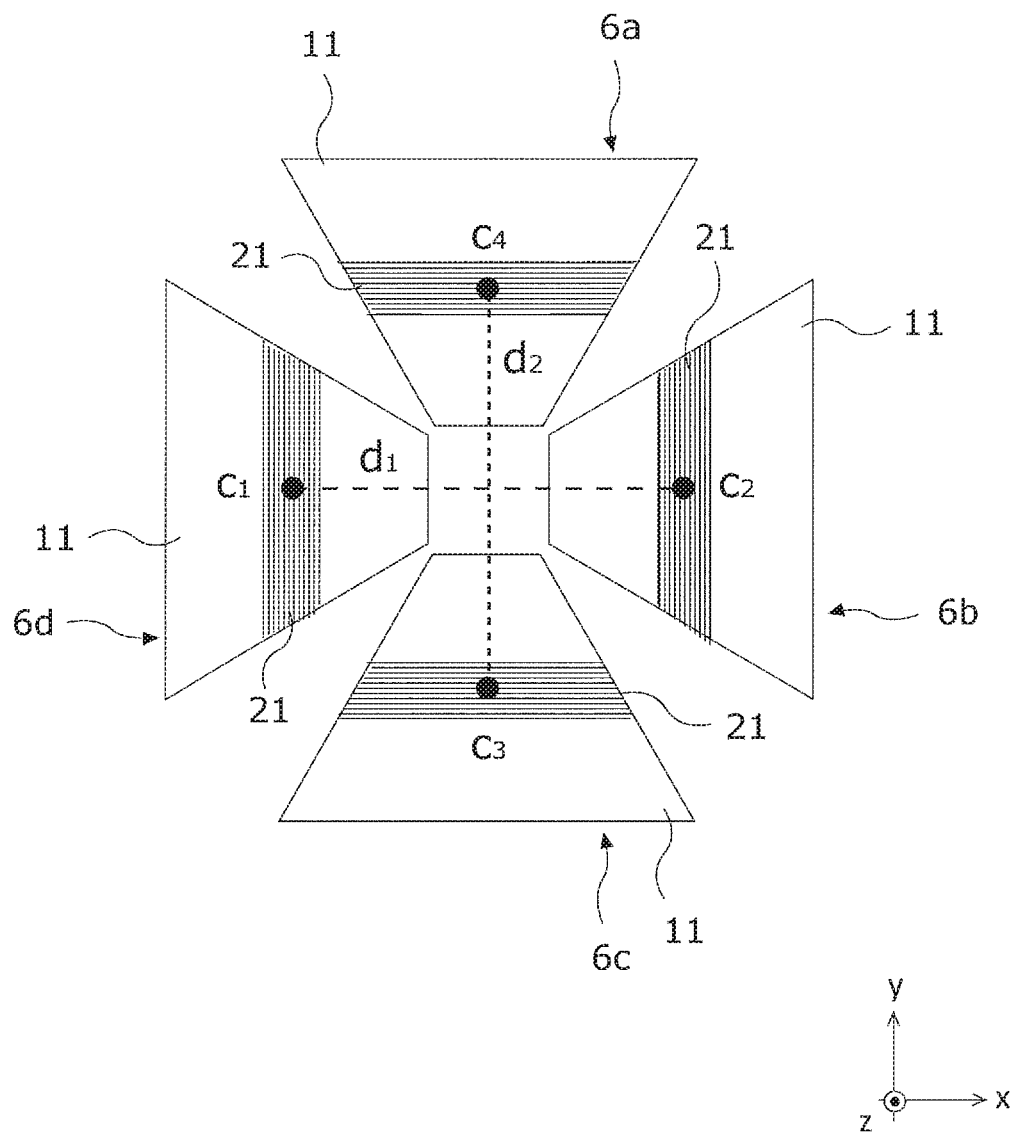
FIG. 30 is a plan view of four inductors which are approximately parallelogram shaped.

FIG. 30 is a plan view of four inductors which are approximately parallelogram shaped. In the example of FIG. 30, inductors 6a to 6d which are approximately plan view trapezoidal shaped are represented. The inductor 6a is forming a pair with inductor 6c which is aligned along an approximately same line in the length direction (y-axis direction). Currents of opposite phases flow in the inductor 6a and the inductor 6c. Similarly, the inductor 6b forms a pair with the inductor 6d which is aligned along the approximately same line in the width direction (x-axis direction). Currents of opposite phases flow in the inductor 6b and the inductor 6d.

In the example of FIG. 30, it is possible to make the distances $d_1$ and $d_2$ shorter than the example in FIG. 29. Thus, it is possible to make the attenuation effect of leakage magnetic field stronger.

Figure 31:
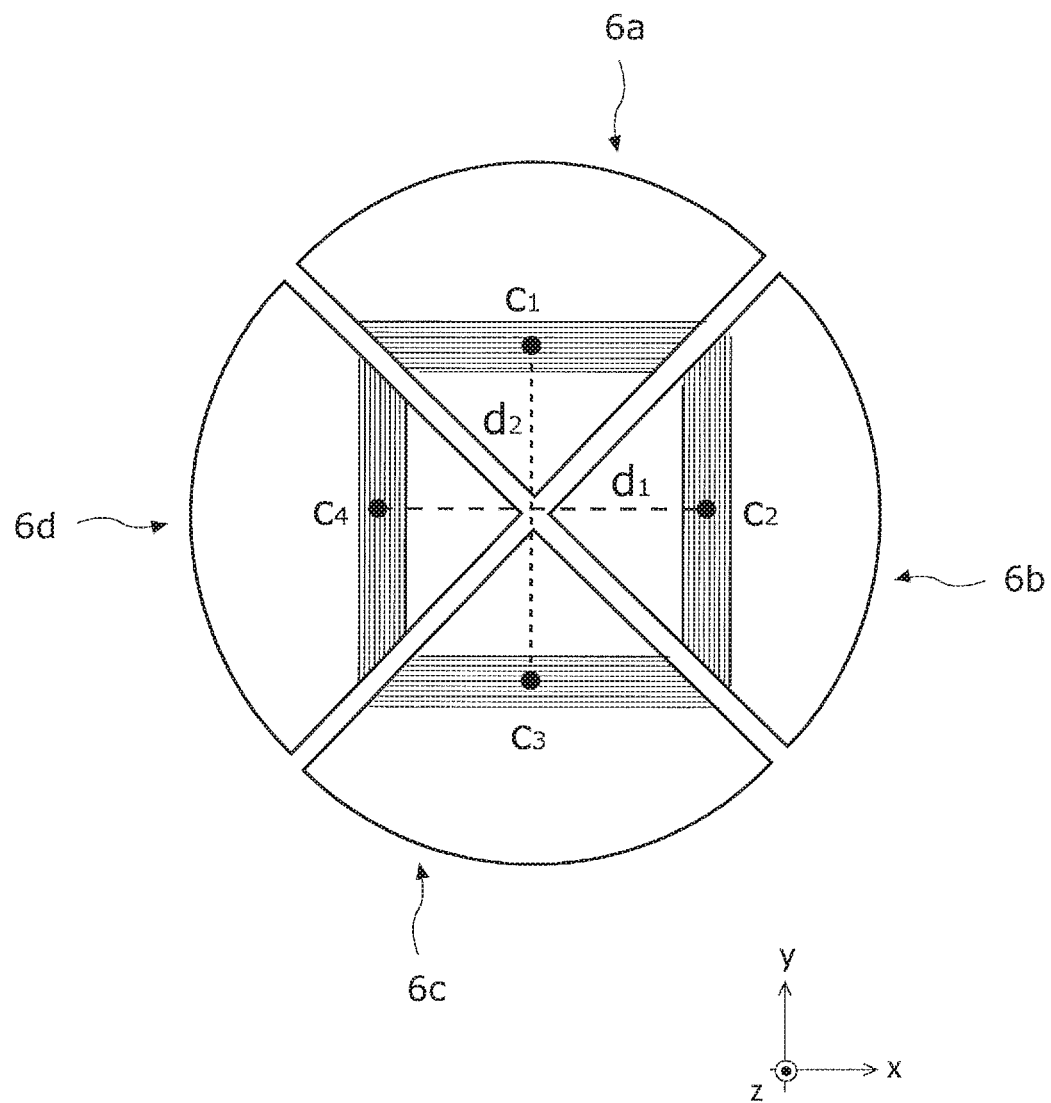
FIG. 31 is a plan view of four inductors which are approximately pie-shaped.

FIG. 31 is a plan view of four inductors which are approximately pie-shaped. In the example of FIG. 31, the inductors 6a to 6d are located so that the inductors are aligned to form an approximately plan view circular shape. Each of the inductors 6a to 6d is pie-shaped when observed from plan views. Similar to FIG. 29 and FIG. 30, the inductor 6a form a pair with the inductor 6c which is aligned along an approximately same line in the length direction (y-axis direction). Currents of opposite phases flow in the inductor 6a and the inductor 6c. Similarly, the inductor 6b forms a pair with the inductor 6d which is aligned along the approximately same line in the width direction (x-axis direction). Currents of opposite phases flow in the inductor 6b and the inductor 6d.

In the example of FIG. 31, it is possible to make the distances $d_1$ and $d_2$ shorter than the examples in FIG. 29 and FIG. 30. Therefore, it is possible to reduce the generation of leakage magnetic fields.

In FIG. 29 to FIG. 31 four inductors were combined in the same side. In FIG. 29 to FIG. 31, the inductor units included two pairs of inductors. In one embodiment, the number of inductors located in the same side is greater than the examples in FIG. 29 to FIG. 31.

Figure 32:
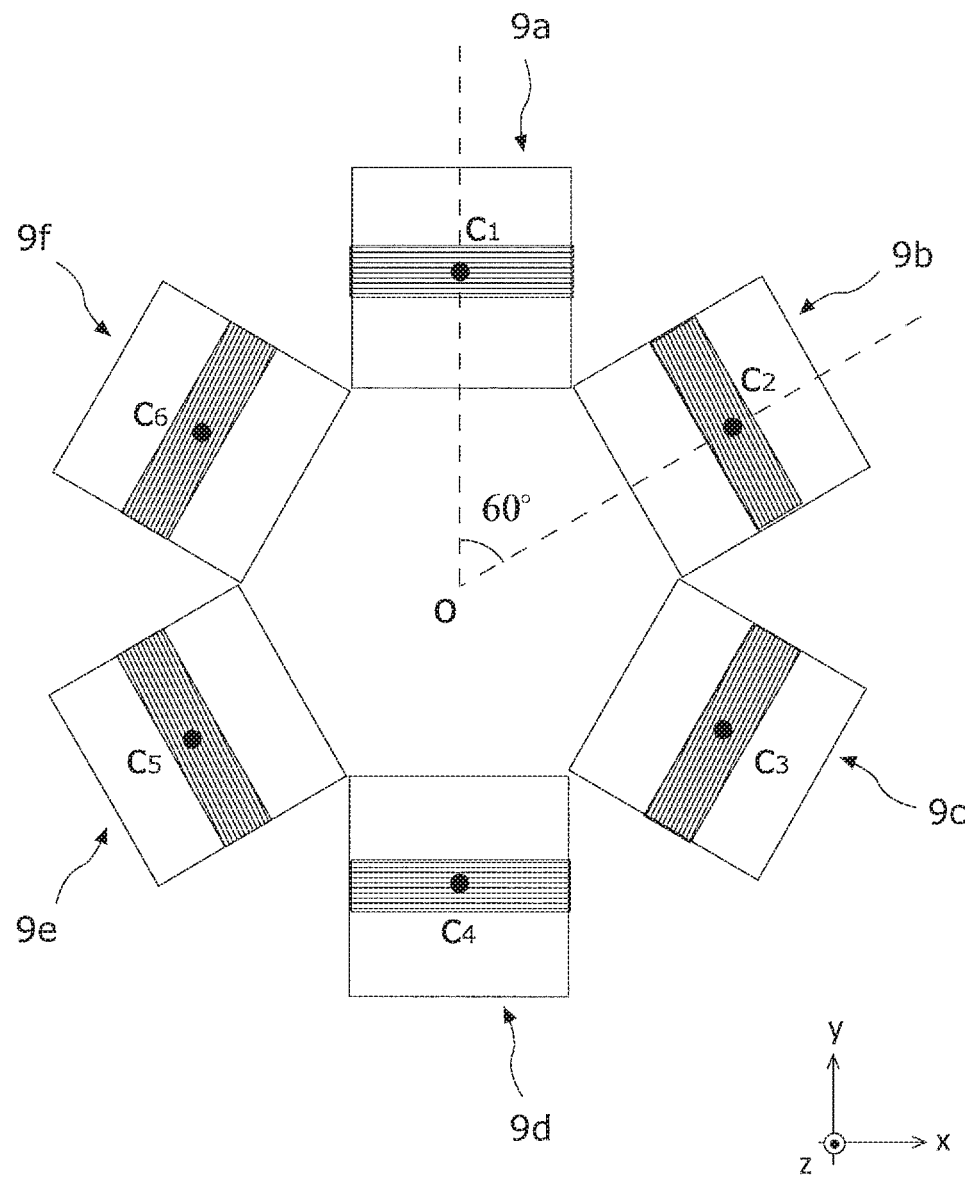
FIG. 32 is a plan view of inductors in a three-phase non-contact power supply system.

FIG. 32 is a plan view of inductors in a three-phase non-contact power supply system. FIG. 32 includes six inductors 9a to 9f which are approximately plan view rectangular shaped. The inductors 9a to 9f are located so that the angles between the inductors are 60 degrees when observed from the center point o. In the example of FIG. 32, the inductors 9a and 9d form a pair. The inductors 9b and 9e also form a pair. The inductors 9c and 9f form pairs as well. Currents of opposite phases flow in the inductors belonging to the same pair.

In the combination of inductors represented in FIG. 32, it is possible to configure the phase difference $\phi$ of the current flowing in each inductor and the angle of the inductors when observed from the center point o to equal values. In one embodiment, the phase difference of the current flowing in the inductor 9a is configured to $\phi=0$. The phase difference of the current flowing in the inductor 9b is configured to $\phi=\pi/3$. The phase difference of the current flowing in the inductor 9c is configured to $\phi=\pi/3$. The phase difference of the current flowing in the inductor 9d is configured to $\phi=\pi$. The phase difference of the current flowing in the inductor 9e is configured to $\phi=4\pi/3$. The phase difference of the current flowing in the inductor 9f is configured to $\phi=5\pi/3$.

Next, a configuration which shortens the distance between the inductors belonging to the same pair is explained. By adopting such a configuration, it is possible to reduce the generation of leakage magnetic fields.

Figure 33:
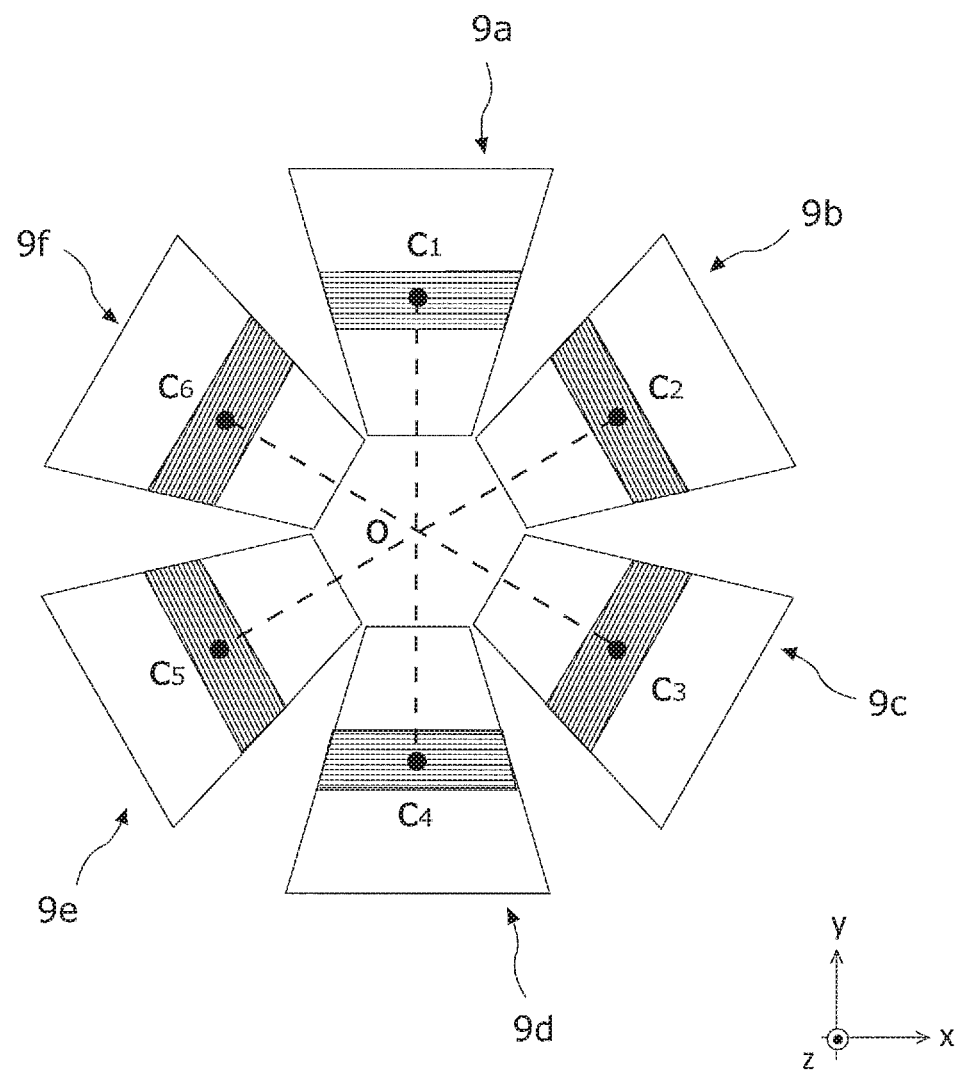
FIG. 33 is a plan view of six inductors which are approximately trapezoidal shaped.

FIG. 33 is a plan view of six inductors which are approximately trapezoidal shaped. In the example of FIG. 33, inductors 9a and 9b form pairs. Also, inductors 9b and 9e form pairs. Inductors 9c and 9f form pairs. Currents of opposite phases flow in inductors which belong to the same pairs. In the example of FIG. 33, it is possible to make the distance between the inductors belonging to the same pair shorter than the example in FIG. 32.

Figure 34:
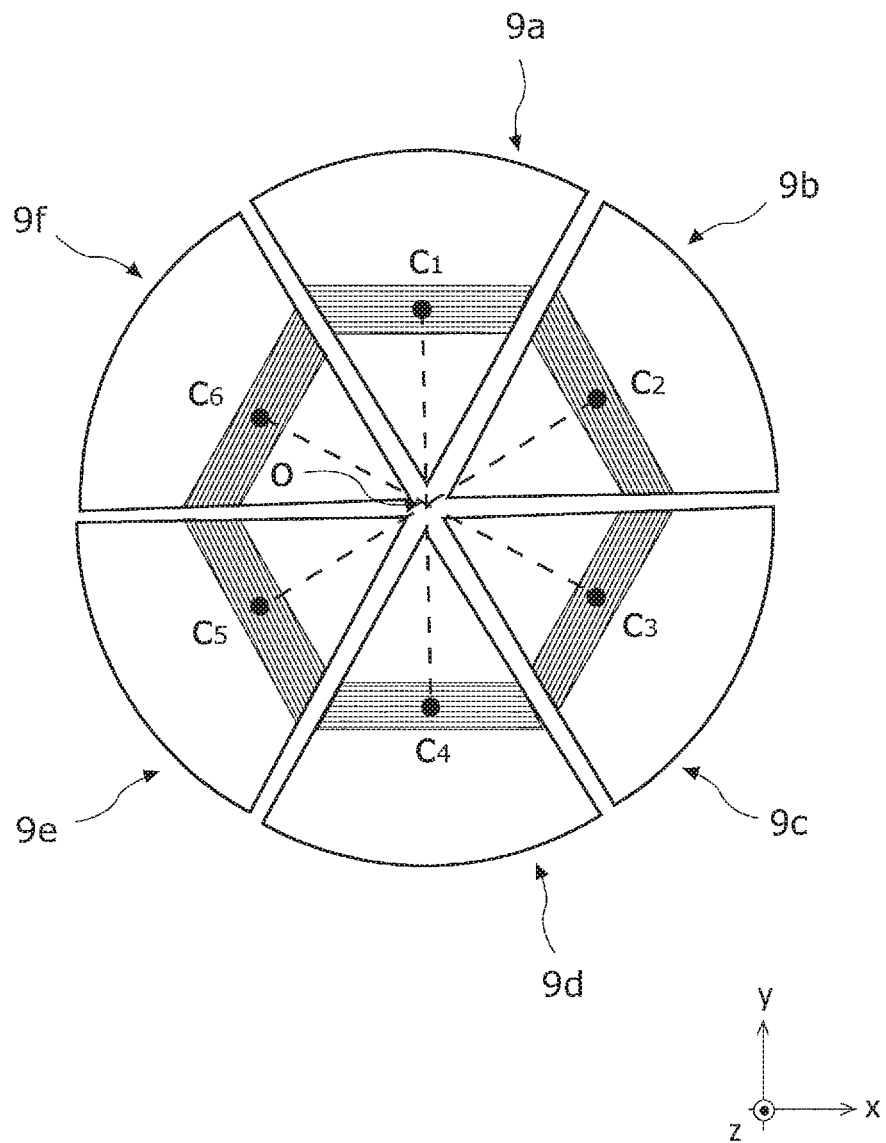
FIG. 34 is a plan view of six inductors which are approximately pie-shaped.

FIG. 34 is a plan view of six inductors which are approximately pie-shaped. In the example of FIG. 34, inductors 9a and 9b form pairs. Also, inductors 9b and 9e form pairs. Inductors 9c and 9f form pairs. Currents of opposite phases flow in inductors which belong to the same pairs. In the example of FIG. 34, it is possible to make the distance between the inductors belonging to the same pair even shorter than the examples in FIG. 32 and FIG. 33. In one embodiment, inductors which are approximately plan view isosceles triangle shaped are used to configure an inductor unit with the allocation of FIG. 34.

In the example above, the number of inductors included in the inductor unit was an even number. However, in another embodiment, the number of inductors included in the inductor unit is an odd number. In another embodiment, the inductors are located in approximately equal angles around the center point. However, to ensure that pairs of inductors which cancel the leakage magnetic fluxes are formed, the number of inductors included in the inductor unit need to be an even number.

Seventh Embodiment

The inductors according to the embodiment are installed to various moving bodies including vehicles. The method for installing and attaching the inductors are not limited. However, it is possible to use jigs to fix the inductors to the vehicles. In the seventh embodiment, a case where jigs which occupy a certain area on the fixed body are used is described.

Figure 35:
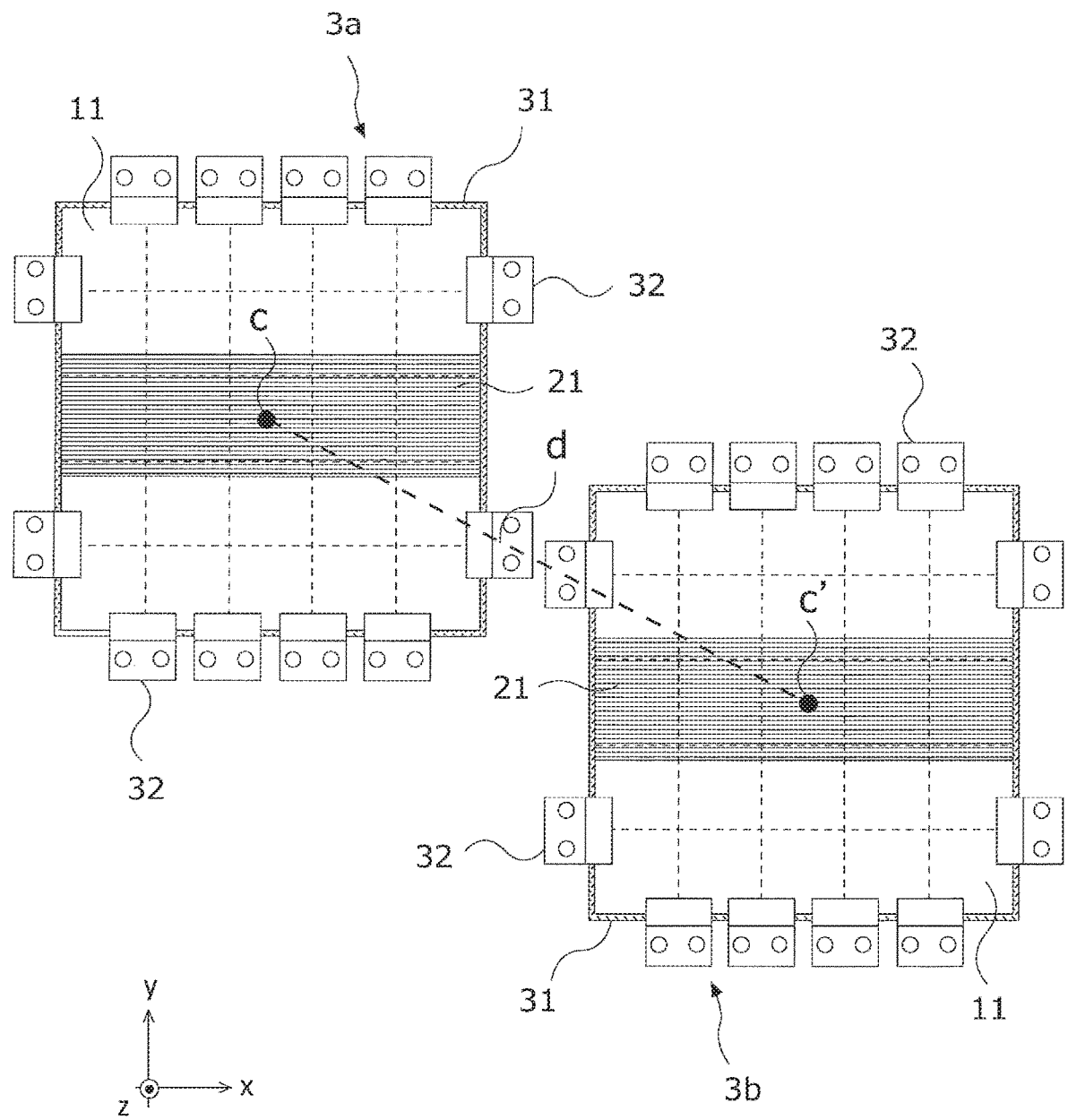
FIG. 35 is a plan view of a combination of inductors fixed with jigs.

FIG. 35 is a plan view of a combination of inductors fixed with jigs. FIG. 35 presents a first example. FIG. 35 includes inductors 3a and 3b which are approximately plan view rectangular shaped. The inductors 3a and 3b are fixed to the body with a plurality of jigs 32 located along the outer circumference. In one embodiment, Jigs 32 are Z-shaped metal fittings which fixed the inductors to the body by using screws. Since the jigs 32 are attached along the outer circumference, the areas which the inductors occupy are becoming large. Therefore, in the configuration of FIG. 35 it is difficult to place the inductors 3a and 3b adjacently to make the distance d between the points c-c' shorter.

In one embodiment, the jig 32 is formed from metals. Examples of metals include stainless steel, copper and titanium. However, the type of material used is not limited. Therefore, in another embodiment the jig 32 is formed from resin. In one embodiment, the jig 32 is an L-shaped metal fitting. Thus, the shape of the jig 32 is not limited. In one embodiment, the jig 32 fixes the inductor to the body by fitting with the structure of the body. In another embodiment, the jig 32 is fixed to the body by using adhesive agents.

Figure 36:
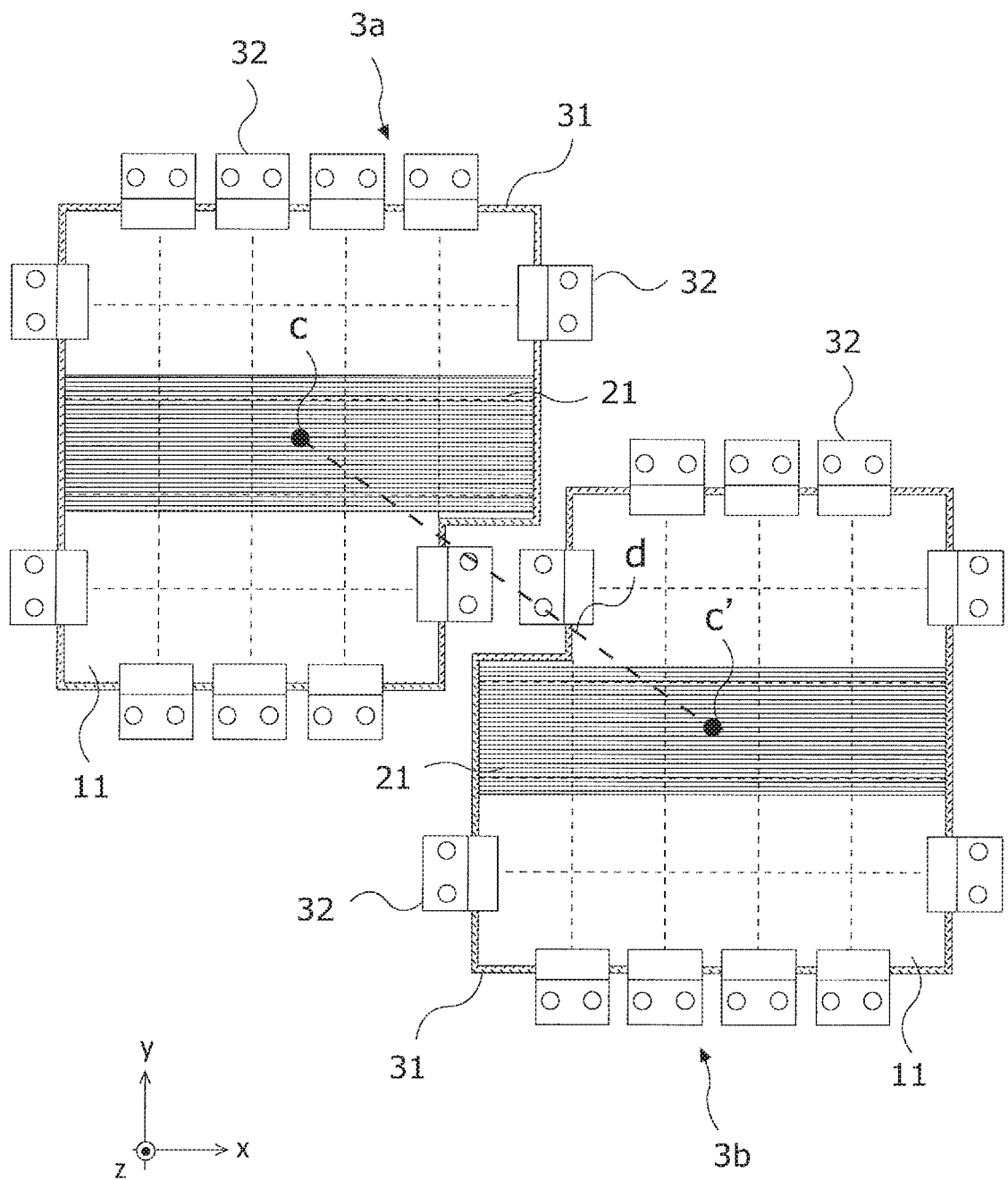
FIG. 36 is a plan view of a combination of inductors fixed with jigs.

FIG. 36 is a plan view of a combination of inductors fixed with jigs. FIG. 36 presents a second example. In the example of FIG. 36, inductors 3a and 3b which have concave portions in the outer circumference are represented. Thus, the inductors 3a and 3b are not perfectly plan view rectangular shaped. As shown in the example of FIG. 36, it is difficult to make the distance d between the points c-c' shorter, due to the presence of jigs attached along the outer circumference of the inductors.

Figure 37:
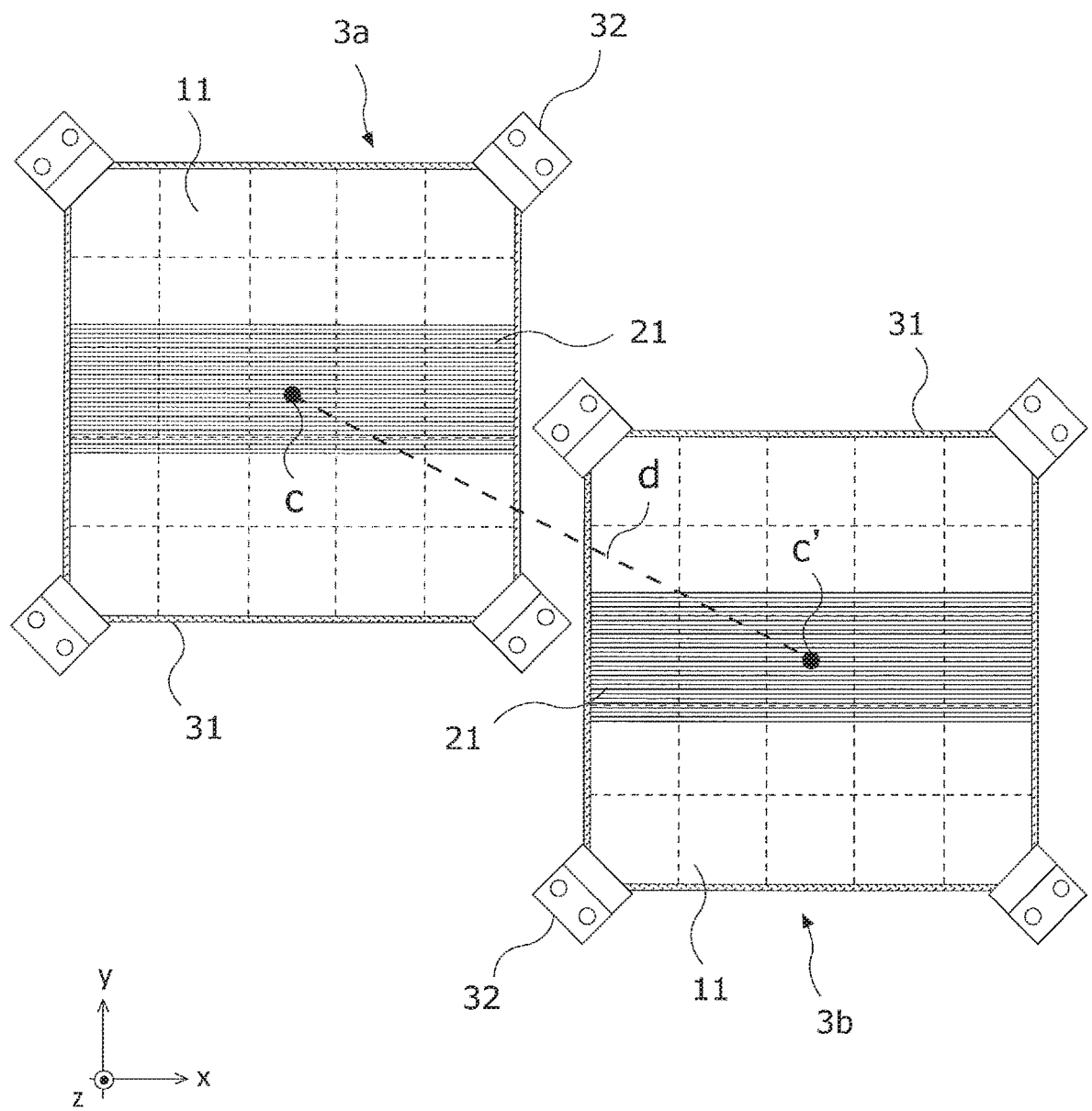
FIG. 37 is a plan view of a combination of inductors fixed with jigs on the vertices.

FIG. 37 is a plan view of a combination of inductors fixed with jigs on the vertices. In the example of FIG. 37, inductors 3a and 3b which are approximately plan view rectangular shaped are represented. On each vertex of the inductors, jigs are attached. By adopting the configuration of FIG. 37, it is possible to reduce the number of jigs 32 which are used. However, it is still difficult to locate the inductors 3a and 3b adjacently due to the jigs 32.

Figure 38:
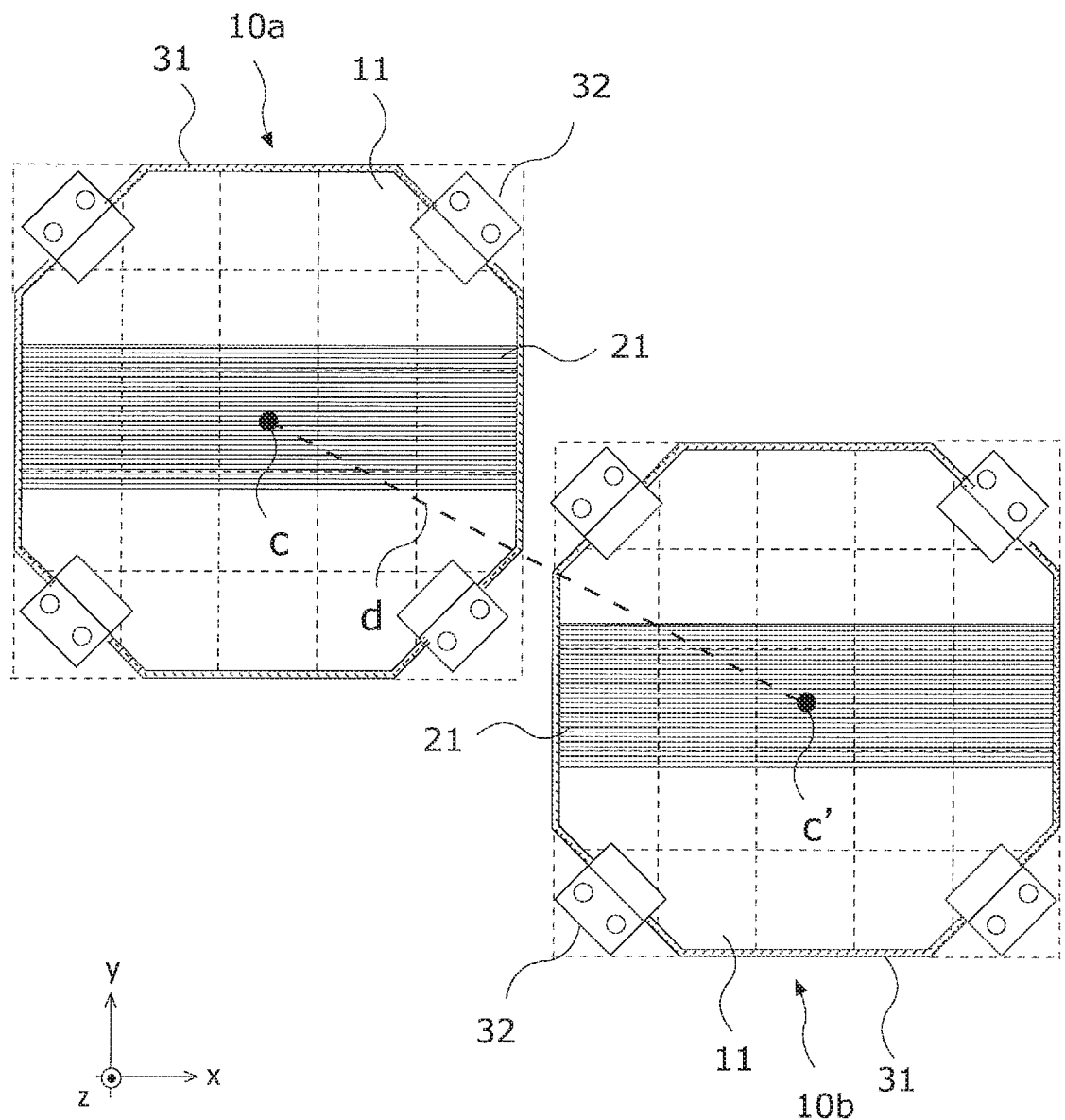
FIG. 38 is a plan view of a combination of inductors fixed with jigs which does not protrude to the exterior.

FIG. 38 represents inductors 10a and 10b which are approximately plan view hexagonal shaped. One way to form the shapes of the inductors 10a and 10b is by cutting each vertex of inductors which are approximately plan view rectangular shaped. In the example of FIG. 38, the corresponding isosceles right triangular areas are represented by broken lines. In the example of FIG. 38, the jigs 32 are attached to the corresponding isosceles right triangular areas. Thus, the jigs do not protrude to the exterior.

In the configuration of FIG. 38, protruding parts of each of the jigs 32 are placed within the isosceles right triangular areas represented by broken lines. The areas occupied when the inductors are attached to the body are limited to the areas of the inductor 10a, the inductor 10b and the regions indicated by the broken lines. Thus, the occupied areas are limited to approximately plan view rectangular shaped areas (regions). It is possible to shorten the distance d between the points c-c', thereby reducing the generation of leakage magnetic fields.

Eighth Embodiment

In the first embodiment, a case when the inductor and the non-contact power supply system were applied to the charging of the electric vehicle was described. However, it is possible to apply the inductor and the non-contact charging system according to the embodiments to other machinery, device or moving bodies. In the eighth embodiment, an example when the inductors and the non-contact power supply system are applied to an elevator is explained.

Figure 39:
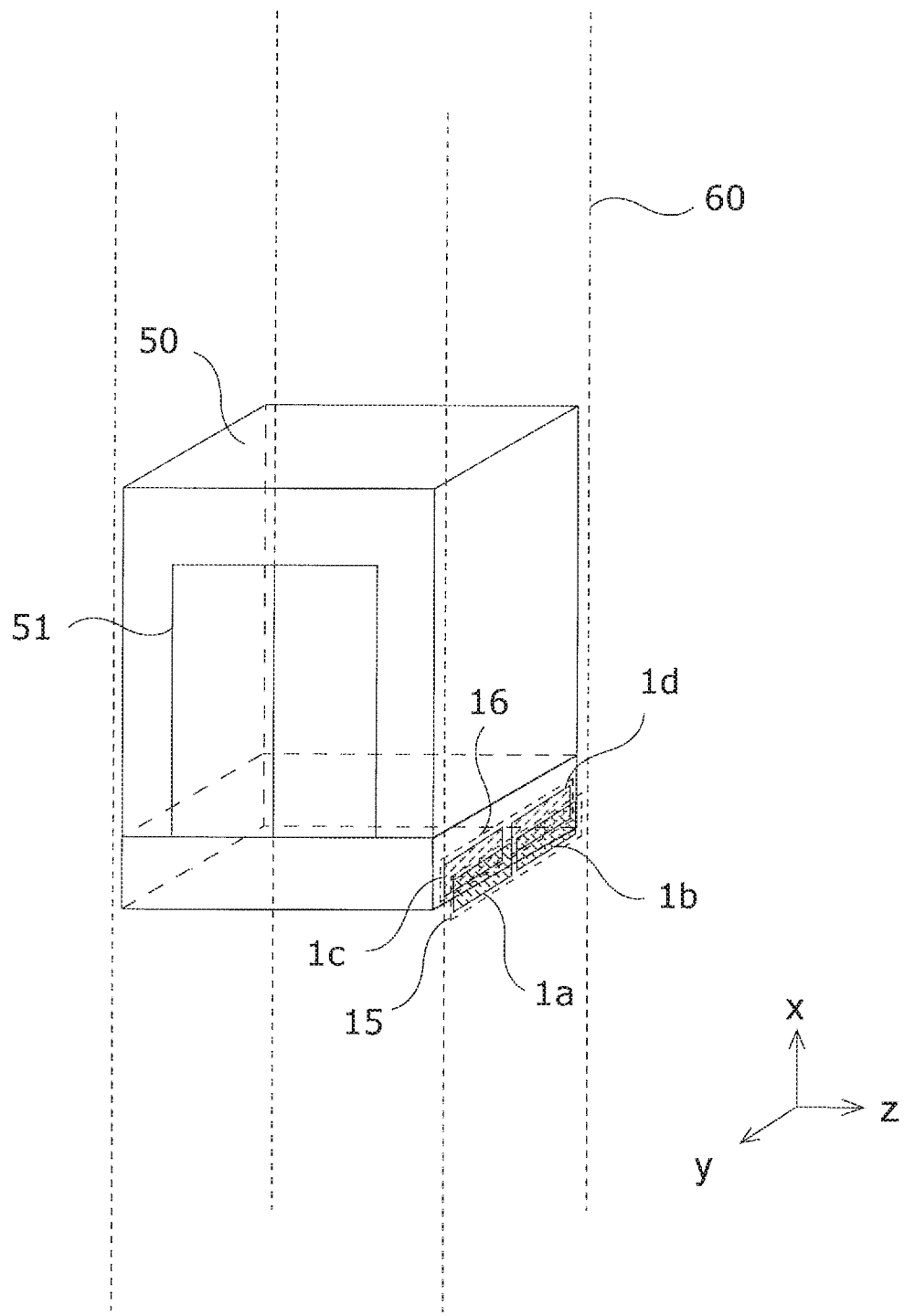
FIG. 39 is a diagram of a non-contact power supply system applied to an elevator.

FIG. 39 is a diagram of a non-contact power supply system applied to an elevator. In FIG. 39, a cage 50 located in the hoistway 60 is illustrated. The cage 50 has a door 51. Along the outer circumference in the bottom of the cage 50, an inductor unit 16 including inductors 1c and 1d are located. On the surface of the hoistway 60 which faces the inductors 1c and 1d, an inductor unit 15 including inductors 1a and 1b are located. If the inductors 1a and 1b are located in the heights of the floors which the cage 50 stops, it is possible to execute wireless power transmission when the cage 50 is stopping.

The inductors 1c and 1d (inductor unit 16) are electrically connected to a secondary battery located within the cage 50. Thus, the inductors 1c and 1d (inductor unit 16) correspond to the receiving side (secondary side). The inductors 1a and 1b (inductor unit 15) are electrically connected to the AC power. Thus, the inductors 1a and 1b (inductor unit 15) correspond to the transmitting side (primary side). In the example of FIG. 39, the inductors 1a to 1d are located in plains where the door 51 is not located. However, the location of the inductors 1a to 1d is not limited. Also, in the example of FIG. 39, two inductors are placed in the same side. However, in one embodiment, the number of inductors is different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An inductor system comprising:
a first inductor including a first magnetic core and a first coil wound around the first magnetic core; and
a second inductor including a second magnetic core and a second coil wound around the second magnetic core;
wherein:
the first inductor and the second inductor are positioned so that a first angle between a first line and a fifth line is equal to or greater than 0 degrees and is equal to or less than 90 degrees,
the first line is in a same direction as a first magnetic flux generated by the first coil and passes through a center of the first coil in a width direction,
a second line is perpendicular to the first magnetic flux and passes through the center of the first coil in a length direction,
a first point is an intersection of the first line and the second line,
a third line is in a same direction as a second magnetic flux generated by the second coil and passes through a center of the second coil in the width direction,
a fourth line is perpendicular to the second magnetic flux and passes through the center of the second coil in the length direction,
a second point is an intersection of the third line and the fourth line,
the fifth line is a line which connects the first point and the second point, and
a cross section of the first coil in the width direction and a cross section of the second coil in the width direction overlap in at least a direction of the first magnetic flux or a direction of the second magnetic flux.

2. The inductor system according to claim 1, wherein the first inductor and the second inductor are positioned so that the first angle is equal to or greater than 50 degrees and is equal to or less than 70 degrees.

3. The inductor system according to claim 1, wherein the first inductor and the second inductor are approximately hexahedral shaped when viewed in plan view.

4. The inductor system according to claim 3, wherein a second angle which is an angle between the first line and a surface of the first inductor facing the second inductor, and a third angle which is an angle between the second line and a surface of the second inductor facing the first inductor, are approximately equal.

5. The inductor system according to claim 1, wherein a side of the first inductor which faces the second inductor and a side of the second inductor which faces the first inductor are shaped so that the first inductor and the second inductor fit with each other.

6. The inductor system according to claim 1, wherein a part of the first magnetic core and a part of the second magnetic core are positioned so that there is an overlap in a thickness direction, the thickness direction being perpendicular to the width direction and the length direction.

7. The inductor system according to claim 1, wherein vertices formed by edge lines of the first inductor and the second inductor have obtuse angles.

8. The inductor system according to claim 1, wherein the first inductor and the second inductor are approximately hexagonal shaped when viewed in plan view.

9. The inductor system according to claim 8, wherein jigs which fix the first inductor and the second inductor to a body are located so that an area occupied by the jig and the first inductor and an area occupied by the jig and the second inductor are both approximately rectangular shaped when viewed in plan view.

10. The inductor system according to claim 1, wherein:
a plurality of inductors including the first inductor and the second inductor surround a center point at intervals of approximately equal angles, and
the second inductor is an inductor which is located adjacent to the first inductor.

11. The inductor system according to claim 10, wherein the plurality of the inductors are approximately trapezoidal shaped, approximately pie shaped or approximately isosceles triangle shaped when viewed in plan view.

12. A non-contact power supply system comprising:
a plurality of the inductor systems according to claim 1, wherein the inductor systems are positioned on a transmission side and a receiving side, respectively.

13. An electric vehicle comprising:
the inductor system according to claim 1,
wherein the inductor system is implemented on a body of the electric vehicle.

14. An inductor system comprising:
a plurality of plate-shaped inductors positioned coplanar to each other, the plurality of inductors surrounding a center point at intervals of approximately equal angles;
each of the inductors including a magnetic core and a coil wound around the magnetic core;
wherein the plurality of inductors are configured so that phase differences of currents provided to each of the inductors are equal to relative angles of the inductors observed from the center point.

* * * * *